(12) United States Patent
Elliott

(10) Patent No.: US 9,342,817 B2
(45) Date of Patent: May 17, 2016

(54) AUTO-CREATING GROUPS FOR SHARING PHOTOS

(75) Inventor: Max Elliott, La Jolla, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 13/220,536

(22) Filed: Aug. 29, 2011

(65) Prior Publication Data

US 2013/0013683 A1  Jan. 10, 2013

Related U.S. Application Data

(60) Provisional application No. 61/505,505, filed on Jul. 7, 2011.

(51) Int. Cl.
G06F 15/16 (2006.01)
G06Q 10/10 (2012.01)
G06Q 50/00 (2012.01)

(52) U.S. Cl.
CPC .............. *G06Q 10/101* (2013.01); *G06Q 50/01* (2013.01)

(58) Field of Classification Search
CPC ..................... G06K 9/00677; G06F 17/30265; G06F 17/30247
USPC ........................................................ 709/204
See application file for complete search history.

(56) References Cited

U.S. PATENT DOCUMENTS

| 3,147,341 A | 9/1964 | Gibson, Jr. |
| 3,200,193 A | 8/1965 | Biggs et al. |
| 3,717,345 A | 2/1973 | Banville |
| 3,943,277 A | 3/1976 | Everly et al. |
| 4,051,491 A | 9/1977 | Toyoda |
| 4,051,520 A | 9/1977 | Davidse et al. |
| 4,068,847 A | 1/1978 | Lukkarila et al. |
| 4,090,216 A | 5/1978 | Constable |

(Continued)

FOREIGN PATENT DOCUMENTS

| CN | 1910619 A | 2/2007 |
| DE | 60235994.5-08 | 4/2010 |

(Continued)

OTHER PUBLICATIONS

International Search Report mailed Sep. 24, 2012 in PCT Application No. PCT/US2012/015314.

(Continued)

*Primary Examiner* — Douglas W Owens
*Assistant Examiner* — Monica C King
(74) *Attorney, Agent, or Firm* — Carr & Ferrell LLP

(57) ABSTRACT

Methods and systems for aggregating and sharing digital content associated with social events via a network are provided. In one example embodiment, a system for aggregating and sharing digital content associated with social events via a network facilitates the aggregation and sharing of digital content, such as photos and videos. The aggregation may be performed with respect to the digital content received from different sources associated with the same social event. The digital content may also be subjected to an image recognition process to identify one or more individuals appearing in the photos or videos. The shared content may also be filtered to display only those photos or videos with specific individuals. In addition, users may be allowed to set privacy rules with respect to the photos and videos within which they appear.

26 Claims, 10 Drawing Sheets

(56) References Cited

U.S. PATENT DOCUMENTS

| | | |
|---|---|---|
| 4,116,444 A | 9/1978 | Mayer et al. |
| 4,133,004 A | 1/1979 | Fitts |
| 4,166,429 A | 9/1979 | Smorzaniuk |
| 4,166,430 A | 9/1979 | Johnson, Jr. |
| 4,203,385 A | 5/1980 | Mayer et al. |
| 4,241,341 A | 12/1980 | Thorson |
| 4,321,635 A | 3/1982 | Tsuyuguchi |
| 4,355,334 A | 10/1982 | Fitzgibbon et al. |
| 4,361,850 A | 11/1982 | Nishimura |
| 4,448,200 A | 5/1984 | Brooks et al. |
| 4,514,727 A | 4/1985 | Van Antwerp |
| 4,533,937 A | 8/1985 | Yamamoto et al. |
| 4,646,075 A | 2/1987 | Andrews et al. |
| 4,649,504 A | 3/1987 | Krouglicof et al. |
| 4,658,247 A | 4/1987 | Gharachorloo |
| 4,672,564 A | 6/1987 | Egli et al. |
| 4,675,562 A | 6/1987 | Herlein et al. |
| 4,677,569 A | 6/1987 | Nakano et al. |
| 4,683,466 A | 7/1987 | Holtey et al. |
| 4,685,054 A | 8/1987 | Manninen et al. |
| 4,685,146 A | 8/1987 | Fenster et al. |
| 4,709,231 A | 11/1987 | Sakaibara et al. |
| 4,727,365 A | 2/1988 | Bunker et al. |
| 4,737,921 A | 4/1988 | Goldwasser et al. |
| 4,757,525 A | 7/1988 | Matthews et al. |
| 4,764,727 A | 8/1988 | McConchie, Sr. |
| 4,807,158 A | 2/1989 | Blanton et al. |
| 4,817,005 A | 3/1989 | Kubota et al. |
| 4,843,568 A | 6/1989 | Krueger et al. |
| 4,860,197 A | 8/1989 | Langendorf et al. |
| 4,864,515 A | 9/1989 | Deck |
| 4,866,637 A | 9/1989 | Gonzalez-Lopez et al. |
| 4,901,064 A | 2/1990 | Deering |
| 4,905,147 A | 2/1990 | Logg |
| 4,905,168 A | 2/1990 | McCarthy et al. |
| 4,933,864 A | 6/1990 | Evans, Jr. et al. |
| 4,934,908 A | 6/1990 | Turrell et al. |
| 4,942,538 A | 7/1990 | Yuan et al. |
| 4,943,938 A | 7/1990 | Aoshima et al. |
| 4,952,917 A | 8/1990 | Yabuuchi |
| 4,956,794 A | 9/1990 | Zeevi et al. |
| 4,962,540 A | 10/1990 | Tsujiuchi et al. |
| 4,969,036 A | 11/1990 | Bhanu et al. |
| 4,980,823 A | 12/1990 | Liu |
| 4,991,223 A | 2/1991 | Bradley |
| 4,992,972 A | 2/1991 | Brooks et al. |
| 5,014,327 A | 5/1991 | Potter et al. |
| 5,034,986 A | 7/1991 | Karmann et al. |
| 5,045,843 A | 9/1991 | Hansen |
| 5,057,744 A | 10/1991 | Barbier et al. |
| 5,064,291 A | 11/1991 | Reiser |
| 5,067,014 A | 11/1991 | Bergen et al. |
| 5,128,671 A | 7/1992 | Thomas, Jr. |
| 5,128,794 A | 7/1992 | Mocker et al. |
| 5,162,781 A | 11/1992 | Cambridge |
| 5,194,941 A | 3/1993 | Grimaldi et al. |
| 5,208,763 A | 5/1993 | Hong et al. |
| 5,212,888 A | 5/1993 | Cary et al. |
| 5,222,203 A | 6/1993 | Obata |
| 5,227,985 A | 7/1993 | DeMenthon |
| 5,230,623 A | 7/1993 | Guthrie et al. |
| 5,253,339 A | 10/1993 | Wells et al. |
| 5,265,888 A | 11/1993 | Yamamoto et al. |
| 5,268,996 A | 12/1993 | Steiner et al. |
| 5,269,687 A | 12/1993 | Mott et al. |
| 5,274,560 A | 12/1993 | LaRue |
| 5,297,061 A | 3/1994 | Dementhon et al. |
| 5,305,389 A | 4/1994 | Palmer |
| 5,307,137 A | 4/1994 | Jones et al. |
| 5,335,557 A | 8/1994 | Yasutake |
| 5,351,090 A | 9/1994 | Nakamura |
| 5,354,202 A | 10/1994 | Moncrief et al. |
| 5,361,147 A | 11/1994 | Katayama et al. |
| 5,363,120 A | 11/1994 | Drumm |
| 5,366,376 A | 11/1994 | Copperman et al. |
| 5,367,615 A | 11/1994 | Economy et al. |
| 5,369,737 A | 11/1994 | Gholizadeh et al. |
| 5,387,943 A | 2/1995 | Silver |
| 5,405,151 A | 4/1995 | Naka et al. |
| 5,446,714 A | 8/1995 | Yoshio et al. |
| 5,446,798 A | 8/1995 | Morita et al. |
| 5,448,687 A | 9/1995 | Hoogerhyde et al. |
| 5,450,504 A | 9/1995 | Calia |
| 5,469,193 A | 11/1995 | Giobbi et al. |
| 5,473,736 A | 12/1995 | Young |
| 5,526,041 A | 6/1996 | Glatt |
| 5,534,917 A | 7/1996 | MacDougall |
| 5,537,638 A | 7/1996 | Morita et al. |
| 5,548,667 A | 8/1996 | Tu |
| 5,550,960 A | 8/1996 | Shirman et al. |
| 5,555,532 A | 9/1996 | Sacha |
| 5,557,684 A | 9/1996 | Wang et al. |
| 5,559,950 A | 9/1996 | Cannon |
| 5,563,989 A | 10/1996 | Billyard |
| 5,572,261 A | 11/1996 | Cooper |
| 5,574,836 A | 11/1996 | Broemmelsiek |
| 5,577,179 A | 11/1996 | Blank |
| 5,577,913 A | 11/1996 | Moncrief et al. |
| 5,586,231 A | 12/1996 | Florent et al. |
| 5,590,248 A | 12/1996 | Zarge et al. |
| 5,598,297 A | 1/1997 | Yamanaka et al. |
| 5,611,000 A | 3/1997 | Szeliski et al. |
| 5,616,078 A | 4/1997 | Oh |
| 5,617,407 A | 4/1997 | Bareis |
| 5,630,033 A | 5/1997 | Purcell et al. |
| 5,631,697 A | 5/1997 | Nishimura et al. |
| 5,647,019 A | 7/1997 | Iino et al. |
| 5,649,032 A | 7/1997 | Burt et al. |
| 5,659,671 A | 8/1997 | Tannenbaum et al. |
| 5,660,547 A | 8/1997 | Copperman |
| 5,668,646 A | 9/1997 | Katayama et al. |
| 5,672,820 A | 9/1997 | Rossi et al. |
| 5,673,374 A | 9/1997 | Sakaibara et al. |
| 5,680,487 A | 10/1997 | Markandey |
| 5,684,887 A | 11/1997 | Lee et al. |
| 5,699,497 A | 12/1997 | Erdahl et al. |
| 5,704,024 A | 12/1997 | Voorhies et al. |
| 5,717,848 A | 2/1998 | Watanabe et al. |
| 5,734,384 A | 3/1998 | Yanof et al. |
| 5,748,865 A | 5/1998 | Yamamoto et al. |
| 5,748,867 A | 5/1998 | Cosman et al. |
| 5,751,928 A | 5/1998 | Bakalash |
| 5,756,354 A | 5/1998 | Tzidon et al. |
| 5,757,360 A | 5/1998 | Nitta et al. |
| 5,760,781 A | 6/1998 | Kaufman et al. |
| 5,761,401 A | 6/1998 | Kobayashi et al. |
| 5,764,803 A | 6/1998 | Jacquin et al. |
| 5,769,718 A | 6/1998 | Rieder |
| 5,774,124 A | 6/1998 | Itoh et al. |
| 5,781,194 A | 7/1998 | Ponomarev et al. |
| 5,786,801 A | 7/1998 | Ichise |
| 5,793,376 A | 8/1998 | Tanaka et al. |
| 5,796,952 A | 8/1998 | Davis et al. |
| 5,798,519 A | 8/1998 | Vock et al. |
| 5,805,170 A | 9/1998 | Burch |
| 5,805,745 A | 9/1998 | Graf |
| 5,805,782 A | 9/1998 | Foran |
| 5,808,617 A | 9/1998 | Kenworthy et al. |
| 5,808,619 A | 9/1998 | Choi et al. |
| 5,812,136 A | 9/1998 | Keondjian |
| 5,812,141 A | 9/1998 | Kamen et al. |
| 5,818,424 A | 10/1998 | Korth |
| 5,818,553 A | 10/1998 | Koenck et al. |
| 5,825,308 A | 10/1998 | Rosenberg |
| 5,831,623 A | 11/1998 | Negishi et al. |
| 5,838,366 A | 11/1998 | Snape et al. |
| 5,852,443 A | 12/1998 | Kenworthy |
| 5,854,632 A | 12/1998 | Steiner |
| 5,856,844 A | 1/1999 | Batterman et al. |
| 5,864,342 A | 1/1999 | Kajiya et al. |
| 5,864,742 A | 1/1999 | Gasper et al. |
| 5,870,097 A | 2/1999 | Snyder et al. |
| 5,870,098 A | 2/1999 | Gardiner |
| 5,880,736 A | 3/1999 | Peercy et al. |

(56) References Cited

U.S. PATENT DOCUMENTS

| | | |
|---|---|---|
| 5,880,856 A | 3/1999 | Ferriere |
| 5,889,505 A | 3/1999 | Toyama et al. |
| 5,890,122 A | 3/1999 | Van Kleeck et al. |
| 5,894,308 A | 4/1999 | Isaacs |
| 5,899,810 A | 5/1999 | Smith |
| 5,903,318 A | 5/1999 | Demay et al. |
| 5,905,894 A | 5/1999 | De Bonet |
| 5,912,830 A | 6/1999 | Krech, Jr. et al. |
| 5,913,727 A | 6/1999 | Ahdoot |
| 5,914,724 A | 6/1999 | Deering et al. |
| 5,915,972 A | 6/1999 | Tada |
| 5,917,937 A | 6/1999 | Szeliski et al. |
| 5,923,318 A | 7/1999 | Zhai et al. |
| 5,923,381 A | 7/1999 | Demay et al. |
| 5,929,860 A | 7/1999 | Hoppe |
| 5,933,150 A | 8/1999 | Ngo et al. |
| 5,933,535 A | 8/1999 | Lee et al. |
| 5,935,198 A | 8/1999 | Blomgren |
| 5,949,424 A | 9/1999 | Cabral et al. |
| 5,953,485 A | 9/1999 | Abecassis |
| 5,959,673 A | 9/1999 | Lee et al. |
| 5,963,209 A | 10/1999 | Hoppe |
| 5,964,660 A | 10/1999 | James et al. |
| 5,966,133 A | 10/1999 | Hoppe |
| 5,977,977 A | 11/1999 | Kajiya et al. |
| 5,982,352 A | 11/1999 | Pryor |
| 5,982,390 A | 11/1999 | Stoneking et al. |
| 5,986,668 A | 11/1999 | Szeliski et al. |
| 5,987,164 A | 11/1999 | Szeliski et al. |
| 5,990,901 A | 11/1999 | Lawton et al. |
| 6,002,738 A | 12/1999 | Cabral et al. |
| 6,009,188 A | 12/1999 | Cohen et al. |
| 6,009,190 A | 12/1999 | Szeliski et al. |
| 6,010,403 A | 1/2000 | Adam et al. |
| 6,016,150 A | 1/2000 | Lengyel et al. |
| 6,018,347 A | 1/2000 | Willis |
| 6,018,349 A | 1/2000 | Szeliski et al. |
| 6,023,523 A | 2/2000 | Cohen et al. |
| 6,026,182 A | 2/2000 | Lee et al. |
| 6,031,934 A | 2/2000 | Ahmad et al. |
| 6,034,691 A | 3/2000 | Aono et al. |
| 6,034,692 A | 3/2000 | Gallery et al. |
| 6,034,693 A | 3/2000 | Kobayashi et al. |
| 6,035,067 A | 3/2000 | Ponticos |
| 6,037,947 A | 3/2000 | Nelson et al. |
| 6,040,842 A | 3/2000 | Wavish et al. |
| 6,044,181 A | 3/2000 | Szeliski et al. |
| 6,046,744 A | 4/2000 | Hoppe |
| 6,049,619 A | 4/2000 | Anandan et al. |
| 6,049,636 A | 4/2000 | Yang |
| 6,058,397 A | 5/2000 | Barrus et al. |
| 6,072,494 A | 6/2000 | Nguyen |
| 6,072,504 A | 6/2000 | Segen |
| 6,081,274 A | 6/2000 | Shiraishi |
| 6,100,898 A | 8/2000 | Malamy et al. |
| 6,101,289 A | 8/2000 | Kellner |
| 6,112,240 A | 8/2000 | Pogue et al. |
| 6,121,953 A | 9/2000 | Walker |
| 6,127,936 A | 10/2000 | Gendel et al. |
| 6,130,673 A | 10/2000 | Pulli et al. |
| 6,137,492 A | 10/2000 | Hoppe |
| 6,141,013 A | 10/2000 | Nelson et al. |
| 6,141,041 A | 10/2000 | Carlbom et al. |
| 6,155,924 A | 12/2000 | Nakagawa et al. |
| 6,157,386 A | 12/2000 | Wilde |
| 6,162,123 A | 12/2000 | Woolston |
| 6,172,354 B1 | 1/2001 | Adan et al. |
| 6,175,367 B1 | 1/2001 | Parikh et al. |
| 6,181,384 B1 | 1/2001 | Kurashige et al. |
| 6,181,988 B1 | 1/2001 | Schneider et al. |
| 6,199,093 B1 | 3/2001 | Yokoya |
| 6,200,138 B1 | 3/2001 | Ando et al. |
| 6,201,581 B1 | 3/2001 | Moriwake et al. |
| 6,203,426 B1 | 3/2001 | Matsui et al. |
| 6,208,347 B1 | 3/2001 | Migdal et al. |
| 6,220,962 B1 | 4/2001 | Miyamoto et al. |
| 6,222,555 B1 | 4/2001 | Christofferson et al. |
| 6,229,553 B1 | 5/2001 | Duluk, Jr. et al. |
| 6,233,291 B1 | 5/2001 | Shukhman et al. |
| 6,252,608 B1 | 6/2001 | Snyder et al. |
| 6,268,875 B1 | 7/2001 | Duluk, Jr. et al. |
| 6,273,814 B1 | 8/2001 | Komoto |
| 6,288,730 B1 | 9/2001 | Duluk, Jr. et al. |
| 6,313,841 B1 | 11/2001 | Ogata et al. |
| 6,313,842 B1 | 11/2001 | Tampieri |
| 6,319,129 B1 | 11/2001 | Igarashi et al. |
| 6,320,580 B1 | 11/2001 | Yasui et al. |
| 6,323,838 B1 | 11/2001 | Thanasack et al. |
| 6,330,000 B1 | 12/2001 | Fenney et al. |
| 6,331,851 B1 | 12/2001 | Suzuki et al. |
| 6,342,885 B1 | 1/2002 | Knittel et al. |
| 6,348,921 B1 | 2/2002 | Zhao et al. |
| 6,353,272 B1 | 3/2002 | van der Hoeven |
| 6,356,263 B2 | 3/2002 | Migdal et al. |
| 6,356,272 B1 | 3/2002 | Matsumoto et al. |
| 6,356,288 B1 | 3/2002 | Freeman et al. |
| 6,361,438 B1 | 3/2002 | Morihira |
| 6,366,272 B1 | 4/2002 | Rosenberg et al. |
| 6,392,647 B1 | 5/2002 | Migdal et al. |
| 6,396,490 B1 | 5/2002 | Gorman |
| 6,400,842 B2 | 6/2002 | Fukuda |
| 6,411,298 B1 | 6/2002 | Goto et al. |
| 6,414,960 B1 | 7/2002 | Kuhn et al. |
| 6,417,836 B1 | 7/2002 | Kumar et al. |
| 6,421,057 B1 | 7/2002 | Lauer et al. |
| 6,426,720 B1 | 7/2002 | Ross et al. |
| 6,426,755 B1 | 7/2002 | Deering |
| 6,456,977 B1 | 9/2002 | Wang |
| 6,476,807 B1 | 11/2002 | Duluk, Jr. et al. |
| 6,488,505 B1 | 12/2002 | Hightower |
| 6,489,955 B1 | 12/2002 | Newhall, Jr. |
| 6,496,189 B1 | 12/2002 | Yaron et al. |
| 6,496,598 B1 | 12/2002 | Harman |
| 6,504,538 B1 | 1/2003 | Freund et al. |
| 6,529,206 B1 | 3/2003 | Ohki et al. |
| 6,529,875 B1 | 3/2003 | Nakajima et al. |
| 6,538,666 B1 | 3/2003 | Ozawa et al. |
| 6,545,663 B1 | 4/2003 | Arbter et al. |
| 6,554,707 B1 | 4/2003 | Sinclair et al. |
| 6,563,499 B1 | 5/2003 | Waupotitsch et al. |
| 6,571,208 B1 | 5/2003 | Kuhn et al. |
| 6,572,475 B1 | 6/2003 | Okabe et al. |
| 6,573,890 B1 | 6/2003 | Lengyel |
| 6,577,312 B2 | 6/2003 | Deering et al. |
| 6,578,197 B1 | 6/2003 | Peercy et al. |
| 6,585,599 B1 | 7/2003 | Horigami et al. |
| 6,594,388 B1 | 7/2003 | Gindele et al. |
| 6,597,363 B1 | 7/2003 | Duluk, Jr. et al. |
| 6,611,265 B1 | 8/2003 | Hong et al. |
| 6,639,594 B2 | 10/2003 | Zhang et al. |
| 6,639,609 B1 | 10/2003 | Hayashi |
| 6,646,639 B1 | 11/2003 | Greene et al. |
| 6,646,640 B2 | 11/2003 | Nagy |
| 6,650,329 B1 | 11/2003 | Koike |
| 6,652,376 B1 | 11/2003 | Yoshida et al. |
| 6,664,955 B1 | 12/2003 | Deering |
| 6,664,959 B2 | 12/2003 | Duluk, Jr. et al. |
| 6,680,746 B2 | 1/2004 | Kawai et al. |
| 6,686,924 B1 | 2/2004 | Mang et al. |
| 6,714,236 B1 | 3/2004 | Wada et al. |
| 6,717,576 B1 | 4/2004 | Duluk, Jr. et al. |
| 6,717,579 B1 | 4/2004 | Deslandes et al. |
| 6,717,599 B1 | 4/2004 | Olano |
| 6,720,949 B1 | 4/2004 | Pryor et al. |
| 6,738,059 B1 | 5/2004 | Yoshinaga et al. |
| 6,744,442 B1 | 6/2004 | Chan et al. |
| 6,750,867 B1 | 6/2004 | Gibson |
| 6,753,870 B2 | 6/2004 | Deering et al. |
| 6,755,654 B2 | 6/2004 | Hightower |
| 6,764,403 B2 | 7/2004 | Gavin |
| 6,771,264 B1 | 8/2004 | Duluk et al. |
| 6,771,813 B1 | 8/2004 | Katsuyama |
| 6,778,181 B1 | 8/2004 | Kilgariff et al. |
| 6,781,594 B2 | 8/2004 | Day |

(56) References Cited

U.S. PATENT DOCUMENTS

| | | |
|---|---|---|
| 6,795,068 B1 | 9/2004 | Marks |
| 6,798,411 B1 | 9/2004 | Gorman et al. |
| 6,803,910 B2 | 10/2004 | Pfister et al. |
| 6,803,964 B1 | 10/2004 | Post et al. |
| 6,807,296 B2 | 10/2004 | Mishima |
| 6,825,851 B1 | 11/2004 | Leather |
| 6,850,236 B2 | 2/2005 | Deering |
| 6,850,243 B1 | 2/2005 | Kilgariff et al. |
| 6,853,382 B1 | 2/2005 | Van Dyke et al. |
| 6,854,632 B1 | 2/2005 | Larsson |
| 6,864,895 B1 | 3/2005 | Tidwell et al. |
| 6,903,738 B2 | 6/2005 | Pfister et al. |
| 6,912,010 B2 | 6/2005 | Baker et al. |
| 6,917,692 B1 | 7/2005 | Murching et al. |
| 6,928,433 B2 | 8/2005 | Goodman et al. |
| 6,956,871 B2 | 10/2005 | Wang et al. |
| 6,962,527 B2 | 11/2005 | Baba |
| 6,995,788 B2 | 2/2006 | James |
| 7,006,101 B1 | 2/2006 | Brown et al. |
| 7,072,792 B2 | 7/2006 | Freifeld |
| 7,079,138 B2 | 7/2006 | Day |
| 7,081,893 B2 | 7/2006 | Cerny |
| 7,085,722 B2 | 8/2006 | Luisi |
| 7,101,284 B2 | 9/2006 | Kake et al. |
| 7,113,193 B2 | 9/2006 | Marks |
| 7,162,314 B2 | 1/2007 | Fay et al. |
| 7,180,529 B2 | 2/2007 | Covannon et al. |
| 7,194,539 B2 | 3/2007 | Hughes et al. |
| 7,214,133 B2 | 5/2007 | Jen et al. |
| 7,233,904 B2 | 6/2007 | Luisi |
| 7,251,315 B1 | 7/2007 | Quinton |
| 7,293,235 B1 | 11/2007 | Powers et al. |
| 7,304,667 B2 | 12/2007 | Watanabe et al. |
| 7,333,150 B2 | 2/2008 | Cooper |
| 7,339,589 B2 | 3/2008 | Annunziata |
| 7,589,723 B2 | 9/2009 | Wang et al. |
| 7,636,126 B2 | 12/2009 | Mallinson |
| 7,777,746 B2 | 8/2010 | Annunziata |
| 7,800,646 B2 * | 9/2010 | Martin ............... 348/157 |
| 7,877,262 B2 | 1/2011 | Luisi |
| 7,880,746 B2 | 2/2011 | Marks et al. |
| 7,916,215 B2 | 3/2011 | Wu et al. |
| 7,920,209 B2 | 4/2011 | Mallinson |
| 7,965,338 B2 | 6/2011 | Chen |
| 8,133,115 B2 | 3/2012 | Campbell |
| 8,194,940 B1 * | 6/2012 | Kiyohara et al. ........... 382/118 |
| 8,204,272 B2 | 6/2012 | Marks |
| 8,243,089 B2 | 8/2012 | Marks et al. |
| 8,270,684 B2 * | 9/2012 | Kiyohara et al. ........... 382/118 |
| 8,284,310 B2 | 10/2012 | Mallinson |
| 8,289,325 B2 | 10/2012 | Green et al. |
| 8,341,145 B2 * | 12/2012 | Dodson et al. ............ 707/722 |
| 2001/0048434 A1 | 12/2001 | Brown |
| 2002/0018063 A1 | 2/2002 | Donovan et al. |
| 2002/0041335 A1 | 4/2002 | Taraci et al. |
| 2002/0047937 A1 | 4/2002 | Wells |
| 2002/0068626 A1 | 6/2002 | Takeda et al. |
| 2002/0080136 A1 | 6/2002 | Kouadio |
| 2002/0107070 A1 | 8/2002 | Nagy |
| 2002/0130866 A1 | 9/2002 | Stuttard |
| 2002/0140703 A1 | 10/2002 | Baker et al. |
| 2002/0162081 A1 | 10/2002 | Solomon |
| 2002/0167518 A1 | 11/2002 | Migdal et al. |
| 2003/0009748 A1 | 1/2003 | Glanville et al. |
| 2003/0043163 A1 | 3/2003 | Day |
| 2003/0045359 A1 | 3/2003 | Leen et al. |
| 2003/0050112 A1 | 3/2003 | Leen et al. |
| 2003/0058238 A1 | 3/2003 | Doak et al. |
| 2003/0104868 A1 | 6/2003 | Okita et al. |
| 2003/0112238 A1 | 6/2003 | Cerny et al. |
| 2003/0117391 A1 | 6/2003 | Olano |
| 2003/0142232 A1 | 7/2003 | Albean |
| 2003/0179220 A1 | 9/2003 | Dietrich, Jr. et al. |
| 2003/0216177 A1 | 11/2003 | Aonuma et al. |
| 2004/0003370 A1 | 1/2004 | Schenk et al. |
| 2004/0051716 A1 | 3/2004 | Sevigny |
| 2004/0056860 A1 | 3/2004 | Collodi |
| 2004/0100582 A1 | 5/2004 | Stanger |
| 2004/0130550 A1 | 7/2004 | Blanco et al. |
| 2004/0130552 A1 | 7/2004 | Duluk, Jr. et al. |
| 2004/0219976 A1 | 11/2004 | Campbell |
| 2004/0263636 A1 | 12/2004 | Cutler et al. |
| 2004/0268413 A1 | 12/2004 | Reid et al. |
| 2005/0001836 A1 | 1/2005 | Day |
| 2005/0019020 A1 | 1/2005 | Sato et al. |
| 2005/0024379 A1 | 2/2005 | Marks |
| 2005/0026689 A1 | 2/2005 | Marks |
| 2005/0078116 A1 | 4/2005 | Sloan et al. |
| 2005/0090302 A1 | 4/2005 | Campbell |
| 2005/0090312 A1 | 4/2005 | Campbell |
| 2005/0243094 A1 | 11/2005 | Patel et al. |
| 2005/0246638 A1 | 11/2005 | Whitten |
| 2005/0253965 A1 | 11/2005 | Cooper |
| 2006/0015348 A1 | 1/2006 | Cooper et al. |
| 2006/0039017 A1 | 2/2006 | Park et al. |
| 2006/0047704 A1 | 3/2006 | Gopalakrishnan |
| 2006/0071933 A1 | 4/2006 | Green et al. |
| 2006/0209210 A1 | 9/2006 | Swan et al. |
| 2006/0214943 A1 | 9/2006 | Day |
| 2006/0238549 A1 | 10/2006 | Marks |
| 2006/0290810 A1 | 12/2006 | Mallinson |
| 2007/0035831 A1 | 2/2007 | Gutierrez Novelo |
| 2007/0094335 A1 | 4/2007 | Tu |
| 2007/0106760 A1 | 5/2007 | Houh et al. |
| 2007/0168309 A1 | 7/2007 | Tzruya et al. |
| 2007/0191097 A1 | 8/2007 | Johnson |
| 2007/0257928 A1 | 11/2007 | Marks et al. |
| 2007/0279427 A1 | 12/2007 | Marks |
| 2008/0052349 A1 * | 2/2008 | Lin ............................... 709/203 |
| 2008/0070655 A1 | 3/2008 | Tanabe |
| 2008/0268956 A1 | 10/2008 | Suzuki |
| 2008/0274798 A1 | 11/2008 | Walker et al. |
| 2009/0007186 A1 | 1/2009 | Hartwell |
| 2009/0040222 A1 | 2/2009 | Green et al. |
| 2009/0063463 A1 | 3/2009 | Turner et al. |
| 2009/0088233 A1 | 4/2009 | O'Rourke et al. |
| 2009/0118015 A1 | 5/2009 | Chang et al. |
| 2009/0193453 A1 | 7/2009 | Cansler et al. |
| 2009/0209337 A1 | 8/2009 | Vrignaud et al. |
| 2009/0227368 A1 | 9/2009 | Wyatt |
| 2010/0029387 A1 | 2/2010 | Luisi |
| 2010/0050090 A1 * | 2/2010 | Leebow ..................... 715/751 |
| 2010/0053430 A1 | 3/2010 | Mallinson |
| 2010/0232656 A1 * | 9/2010 | Ryu ........................ 382/118 |
| 2010/0325218 A1 * | 12/2010 | Castro et al. ................ 709/206 |
| 2011/0013810 A1 * | 1/2011 | Engstrom et al. ............ 382/118 |
| 2011/0052012 A1 * | 3/2011 | Bambha et al. ............. 382/118 |
| 2011/0064281 A1 * | 3/2011 | Chan ........................ 382/118 |
| 2011/0181776 A1 | 7/2011 | Mallinson |
| 2011/0205240 A1 | 8/2011 | Marks et al. |
| 2011/0249072 A1 | 10/2011 | Marks |
| 2011/0249144 A1 * | 10/2011 | Chang ....................... 348/231.3 |
| 2011/0281648 A1 | 11/2011 | Weising |
| 2012/0250950 A1 * | 10/2012 | Papakipos et al. ............ 382/118 |
| 2013/0013683 A1 | 1/2013 | Elliott |
| 2014/0087877 A1 | 3/2014 | Krishnan |

FOREIGN PATENT DOCUMENTS

| | | |
|---|---|---|
| EP | 0553973 | 8/1993 |
| EP | 0947948 | 10/1999 |
| EP | 1176559 | 1/2002 |
| EP | 1229499 | 8/2002 |
| EP | 1541207 | 6/2005 |
| EP | 1541208 | 6/2005 |
| EP | 2569063 | 3/2013 |
| FR | 1419481 | 4/2010 |
| GB | 1419481 | 4/2010 |
| JP | 11179050 | 7/1999 |
| JP | 2001198350 A | 7/2001 |
| JP | 2002052256 A | 2/2002 |
| JP | 2002153676 A | 5/2002 |
| JP | 2007136215 A | 6/2007 |
| JP | 2008155140 A | 7/2008 |

(56) References Cited

FOREIGN PATENT DOCUMENTS

| | | |
|---|---|---|
| JP | 2008278937 A | 11/2008 |
| JP | 2010088694 A | 4/2010 |
| WO | 0010130 | 2/2000 |
| WO | 0129768 | 4/2001 |
| WO | 2006041993 | 4/2006 |
| WO | 2007001633 | 1/2007 |
| WO | 2013006584 | 1/2013 |

OTHER PUBLICATIONS

Palmer, Chris et al., "Title Based Games FAQ," GAMEDV, Aug. 31, 2000, http://www.ggdn.net/GameDev/3d/BlockGames/article728.asp.htm, accessed Oct. 25, 2011.

Peercy, et al., "Interactive Multi-Pass Programmable Shading," Computer Graphics Proceedings, SIGGRAPH 2000, Jul. 23-28, 2000. p. 425-432.

Phong, Bui Tuong, "Illumination for Computer Generated Pictures," Communication of the ACM, 18(6), pp. 311-317, Jun. 1975.

Prat, David R., "A Software Architecture for the Construction and Management of Real-Time Virtual Worlds", Jun. 1993, pp. 62-67.

Project Gotham Racing release information, Aug. 2, 2006, Gamespot.com, http://www.gamespot.com/xbox/driving/projectgothamracing/similar.html?mode=versions.

Project Gotham Racing Screenshot, Avault, Nov. 14, 2001, http://www.avault.com/consoles/reviews/xbox/avscreenshot.asp?pic=pgr&num=5.

Proudfoot, et al., "A Real-Time Procedural Shading System for Programmable Graphics Hardware," Computer Graphics Proceedings, SIGGRAPH 2001, Aug. 2001. p. 159-170.

Road Blasters Path Markers, MobyGames, Jan. 25, 2007, http://www.mobygames.com/game/nes/roadblasters/screenshots/gameShotId,35174/.

RoadBlasters Release Information, GameSpot, Jan. 25, 2007, http://www.gamespot.com/nes/driving/roadblasters/index.html?q=roadblasters.

Rushmeier, et al., "Extending the Radiosity Method to Include Specularly Reflecting and Translucent Materialsm" ACM Transaction on Graphics, vol. 9, No. 1, pp. 1-27, Jan. 1990

Russell, M. et al., "Applications of Automatic Speech Recognition to Speech and Language development in Young Children", Proc of ICSLP, 1996.

Schlick, C., "A Survey of Shading and Reflectance Models," Computer Graphics Forum, Jun. 1994, pp. 121-132, vol. 13, No. 2.

Schlick, C., "A Fast Alternative to Phong's Specular Model," Graphics Gems IV, Morgan Kaufmann, pp. 385-386, 1994.

Segen et al., "Gesture VR: Vision-Based 3D Hand Interface for Spatial Interaction," Multimedia '98 Proceedings of Sixth ACM International Conference on Multimedia, 1998, pp. 455-464.

Pearce, "Shadow Attenuation for Ray Tracing Transparent Objects", "Graphics Gems", 1991, pp. 397-399.

Spagnoletti, Simon, "Phillips Ambilight TV," Home Entertainment, engadget, Jul. 8, 2004.

Tang et al., "Blending Structured Graphics and Layout", Symposium on User Interface Software and Technology, Proceedings of the 7th Annual ACM Symposium on User Interface Software and Technology, Marina del Rey California, United States, pp. 167-173 (1994).

Taylor, Philip, "The MSDN Shader Workshop Application, Part 1," Microsoft Corporation, Mar. 25, 2002, http://msdn.microsoft.com/en-us/library/ms810474(d=printer), accessed Oct. 26, 2011.

Thalmann, et al., "Interactive Computer Animation", 1996, Prentice Hall Europe, pp. 182-186.

The PlayStation 2 Books Riding Spirits Official Complete Guide (graphics), Japan, SoftBank Publishing, Sep. 6, 2003, First Edition, p. 005.

Voorhoies, D., et al., "Reflection Vector Shading Hardware", Computer Graphics Proceedings, annual conference Series 1994, Siggraph 94 conference Proceedings, ACM, 1994, pp. 163-166, New York, NY, USA.

Ware et al., "Reaching for Objects in VR: Displays:Lag and Frame Rate," ACM Transactions on Computer-Human Interaction, vol. 1, No. 4, Dec. 1994.

Woo et al., "A Survey of Shadow Algorithms". "IEEE Computer Graphics and Applications", 1990, IEEE Service Center, New York, NY US, vol. 10, Nr: 6, pp. 13-32.

Ohashi et al., "A Gesture Recognition Method for a Stick Input System (<Special Issue> Human Interface and Interaction)", IPSJ Journal 40(2), 567-576, Feb. 15, 1999.

Agui, Takeshi et al., "Computer Graphics", Shokodo Co., Ltd., Jul. 1992, 1st ed., pp. 80-101 (Environment Mapping).

Auslander et al., "Fast, Effective Dynamic Compilatino", SIGPLAN Notices ACM, vol. 31, N. 5. May 1996. p. 149-159.

Bates, Jason, "Half-Life Review," IGN, Nov. 25, 1998, http://pc.ign.com/articles/153/154107p1.html, accessed Oct. 25, 2011.

Beshers et al., "Generating Efficient Virtual Worlds for Visualization Using Partial Evaluation and Dynamic Compilation," SIGPLAN Notices ACM USA. vol. 32, No. 12, Dec. 1997. p. 107-115.

Blinn, J.F. et al., "Texture and Reflection in Computer Generated Images", Communications of the Association for Computing Machinery, ACM, Oct. 1, 1976, pp. 542-547, vol. 19, No. 10, New York, NY USA.

Blinn, J.F., "Light Reflection Functions for Simulation of Clouds and Dusty Surfaces," ACM SIGGRAPH Computer Graphics, vol. 16, Issue 3, Jul. 1982.

Blinn, J.F., "Models of Light Reflection for Computer Synthesized Pictures", Proc. Siggraph 1977, Computer Graphics 11(2), pp. 92-198, Jul. 1977.

Calvert, Justin, "SCEE's lastest plans for its EyeToy peripheral will effectively turn the PlayStation 2 into a videophone. First screens inside.", SCEE announces EyeToy;Chat, Game Spot, http://www.gamespot.com/news/6095429.html., May 5, 2004, accessed Jun. 5, 2006.

Davenport, G. et al., "Cinematic Primitives for Multimedia", IEEE Computer Graphics and Applications (Aug. 1991), vol. 11, No. 4, pp. 67-74.

Dorsey, Julie O'B et al., "Design and Simultaion of Opera Lighting and Projection Effects," Program of Computer Graphics, Computer Graphics, Jul. 1991, vol. 25, No. 4, New York.

European Examination Report mailed Jul. 27, 2010 in European patent application No. 04 256 331.2, filed Oct. 14, 2004.

Fernando R. and Kilgard M. J. 2003 "The Cg Tutorial:the Definitve Guide to Programmable Real-Time Graphics." Addison-Wesley Longman Publishing Co., Inc., in CH. 1 sections 1.2 and 1.4, in Appendix C section C.2.

Fitzmaurice et al., "Sampling, Synthesis, and Input Devices," Communications of the ACM, vol. 42, No. *, Aug. 1999.

Foley et al., "Computer Graphics: Principles and Practice", Second Edition in C, Oct. 1996, pp. 721-745.

Gauvain, J.L. et al., "Speech recognition for an Information Kiosk", Proc. of ICSLP, 1996.

Gauvain, J. L. et al., "Spoken LanguageComponent of the MASK Kiosk", Human Comfort and Security of Information Systems, 1995.

Gauvain, J.L. et al, "The LIMSI Continuous Speech Dictation System", Proc. ARPA Human Language & Technology, 1994.

Gauvain, J.L. et al, "The LIMSI Continuous Speech Dictation System: Evaluation on the ARPA Wall Street Journal Task", Proc. of the IEEE-ICASSP, 1994.

Shiu, YC, et al., Pose Determination of Circular Cylinders Using Elliptical and Side Projections, Proceedings of the International Conference on Systems Engineering. Fairborn, Aug. 1-3, 1991; New York, IEEE, USA. p. 265-268. ISBN: 0-7803-0173-0 ; Wright State University, Dept. of Electrical Engineering, Dayton, OH, 1991.

Nicewarner, Keith E, et al., Vision-Guided Grasping of a Strut for Truss Structure Assembly, Electrical, Computer and Systems ENgineering Dept., Center for Intelligent Robotic Systems for Space Exploration. Rensselaer Polytechnic Institute, Troy, NY. Oct. 1992., pp. 86-93.

Goddeau, D. et al., "Galaxy: A Human-Language Interface to On-Line Travel Information", Proc. of ICSLP, 1994.

(56) References Cited

OTHER PUBLICATIONS

Gueziec, A. et al., "Simplicial Maps for Progressive Transmission of Polygonal Surfaces", Proceedings, VRML 98 Third Symposium on the Virtual Reality Modeling Language ACM, 1998, pp. 25-31, 131, New York, NY, USA.

Hayano, Masayuki, et al., "Mesh Simplification Using Edge Operation with Feature Detection", Inf. Proc. Soc. of Japan SIG Technical Report, Feb. 27, 1998, vol. 98, No. 16.

House, D., "Spoken-Language Access to Multimedia (SLAM): Masters Thesis", Oregon Graduate Inst., Dept. of CS and Eng., 1995.

internet.com, "Graphical User Interface", available at http://www.webopedia.com; accessed Sep. 24, 2004. Last Modified May 17, 2004.

Konma, Toshihiro, "Rendering and Texture: Introduction to CG Creation in the Multimedia Age", Nikkei Bus. Pub., Inc. Nov. 1996, No. 122, pp. 237 (Bump Mapping).

Language Industry Monitor, "Janet Baker's Optimism", http://www.lim.nl/monitor/dragon.html, 1992, accessed Oct. 25, 2011.

Nilsson, "ID3 Tag Version 2.3.0," ID3v2: The Audience is Informed, Feb. 3, 1999; http://www.id3.org/id3v2.3.0 (last accessed Oct. 26, 2011).

Matsushita, Yasuyuki, "Special Effects: Interobject Reflection effect: Starting OpenGL Programming with Mesa 3D", Itsutsubachi Res. Co., Ltd., Jan. 2000, vol. 3, No. 1, pp. 148-153.

Moller, T. & Haines, E., "Real-time rendering", 1999, pp. 69-81, A.K. Peters Ltd.

Mostow, Jack, et al., "Towards a Reading Coach That Listens: Automated Detection of Oral Reading Errors", Proc. of the 11th Ntl. Conf. on A.I., 1993.

Nakamura, Hiroko, et al., "Adaptive Transmission of Polygonal Patch Datasets Taking into Account Shape and Color Distribution Features", Inf. Proc. Soc. of Japan SIG Technical Report, Sep. 8, 2000, vol. 2000, No. 8.

Nayar, Shree K., et al., "Lighting Sensitive Display," ACM Transactions on Graphics, Oct. 2004, vol. 23, No. 4, pp. 963-979, New York.

International Search Report mailed Feb. 4, 2003 in PCT Application No. PCT/US02/26360.

International Preliminary Examination Report mailed Dec. 15, 2003 in PCT Application No. PCT/US02/26360 filed Aug. 16, 2002.

European Search Report mailed Apr. 2, 2004 in EP Application No. EP02001875.

Communication from the Examining Division mailed May 24, 2007 in EP Application No. EP02001875.

Communication from the Examining Division mailed Jun. 17, 2009 in EP Application No. EP02001875.

Supplementary European Search Report dated Aug. 22, 2006 in EP02768608.

International Search Report mailed Feb. 6, 2006 in PCT Application No. PCT/US2005/035947.

Communication from Examining Division mailed Jan. 12, 2007 in EP02768608.8.

Communication from Examining Division regarding Intention to grant a European Patent mailed Nov. 12, 2009 in EP02768608.8.

Communication from Examining Division regarding Decision to grant a European Patent mailed Mar. 18, 2010 in EP02768608.8.

Partial European Search Report mailed Jul. 19, 2007 in EP 01306264.1.

European Search Report mailed Oct. 12, 2007 in EP 01306264.1.

Communication from Examining Division mailed Jul. 8, 2008 in EP 01306264.1.

Communication from Examining Division mailed Oct. 16, 2009 in EP 01306264.1.

Supplementary European Search Report mailed Jan. 2, 2014 in EP 11780949.1.

Communication from Examining Division regarding European Search Report—Search Not Possible mailed Dec. 22, 2004 in EP 04256331.2.

Communication from Examining Division mailed Nov. 7, 2008 in EP 04256331.2.

Communication from Examining Division mailed Jul. 27, 2010 in EP 04256331.2.

International Search Reoprt mailed Aug. 7, 2007 in PCT Application No. PCT/US2006/017574.

Communication from Examining Division regarding European Search Report—Search Not Possible mailed Dec. 22, 2004 in EP 04256342.9.

1st Communication from Examining Division mailed Apr. 28, 2006 in EP 04256342.9.

International Search Report mailed Mar. 31, 2011 in PCT Application No. PCT/US2011/023780.

European Search Report mailed Aug. 20, 2004 for EP Application No. EP04251842.3.

Communication from Examining Division mailed Apr. 28, 2005 in EP Application No. 04251842.3.

Communication from the Examining Division mailed Jun. 14, 2006 regardingSummons to Attend Oral Proceedings for EP Application No. 04251842.3.

Communication from Examining Division mailed Feb. 1, 2007 regarding Decision to Refuse the Application in EP Application No. 04251842.3.

Screen Shot from *Mad Driver* v. *Net*, 3D-Level (date of screen shot and/or software producing screen shot unknown).

Image from "Suzuki Alstare Extreme Racing." IGN Insider (Online), Dec. 12, 2000. [retrieved on Sep. 18, 2015]. Retrieved from the Internet URL: <http://www.ign.com/images/games/suzuki-alstare-extreme-racing-pc-14981/4fa6c987cdc388ed13e5b41e>.

Norberg, R. "Phoenix Fighters Official Website." Bitwise, Alive Mediasoft, Nov. 18, 1999. [retrieved on Jun. 23, 2004]. Retrieved from the Internet: <URL: www.cs.umu.se/~dva95rng/pf.html>.

3Dlevel.com. "3D-Level: *Mad Driver* v. *Net*." Oct. 21, 2002. [retrieved on Jun. 23, 2004]. Retrieved from the Internet: <URL: www/3dlevel.com/maddriver.net.php>.

www.3dlevel.com Feb. 21, 2002; [retrieved on Jun. 23, 2004]. Retrieved from the Internet: <URL: www.3dlevel.com/index.php>.

MobyGames.com. "Pitstop II." EPYX, Synergistic Software, 1984. [retrieved on Jun. 23, 2004]. Retrieved from the internet: <URL: www.mobygames.com/game/versions/gameid,578>.

Nintendo of America, Inc. Mario Kart 64: The Game Manual Archive. 1997. Retrieved from the Internet: <URL: www/gamemanuals.net/download/cb07befddcc6f305d53088749775dcc2/Mario%20Kart%2064.pdf>.

IGN.com. Ridge Racer 64 (N64) Screenshot. 2000. [retreived Feb. 7, 2007]. Retrieved from the Internet: <URL: http://media.ign64.ign.com/media/011/011541/img_1221593.html>.

Gamespot.com. Ridge Racer 64 Review. 2000. [retreived Feb. 7, 2007]. Retrieved from the Internet: <URL: www.gamespot.com/n64/driving/ridgeracer64/review.html>.

Gamespot.com. Ridge Racer 64 Release Date Screenshot. 2000. [retreived Feb. 7, 2007]. Retrieved from the Internet: <URL: www.gamespot.com/n64/driving/ridgeracer64/index.html?q=ridge%20racer%2064>.

Acclaim. Turok: Dinosaur Hunter. The Game Manual Archive. 1997. Retrieved from the Internet: <URL: www.gamemanuals.net/download/df6d1a913ff01c09207d682a242c1a15/Turok.pdf>.

"Andale Counters Getting Started Manual." Aug. 2005. [retrieved on Jan. 11, 2006]. Retrieved from the Internet: <URL: http://company.vendio.com/docs/andale_manual_counters.pdf>.

Office Action mailed Jul. 3, 2014 in Chinese Application No. 201180034304.4 filed Jan. 11, 2013.

Office Action mailed Sep. 16, 2014 in Japanese Application No. 2013-510086 filed Feb. 4, 2011.

Office Action mailed Mar. 13, 2015 in Chinese Application No. 201180034304.4 filed Feb. 4, 2011.

Final Office Action mailed Apr. 7, 2015 in Japanese Application No. 2013-510086 filed Feb. 4, 2011.

Fighting Studio, Playstation Complete Mastery Series 65 Tsurimichi—Sea fishing episodes—Official guidebook (Japanese), Futabasha Publishers Ltd., Nov. 25, 1998, 2nd printing. 6 pages.

(56) References Cited

OTHER PUBLICATIONS

Osborne, S. "Suzuki Alstare Extreme Racing." IGN Insider (Online), Dec. 12, 2000. [retrieved on Sep. 18, 2015]. Retrieved from the Internet URL: <http://www.ign.com/articles/2000/12/22/suzuki-alstare-extreme-racing>.

Notice of Allowance mailed Jan. 26, 2016 in Japanese Application 2013-510086 filed Feb. 4, 2011.

Office Action, mailed Feb. 9, 2016, U.S. Appl. No. 12/777,268, filed May 11, 2010.

* cited by examiner

AUTO-CREATING GROUPS FOR SHARING PHOTOS

CROSS-REFERENCE TO RELATED APPLICATIONS

This application claims the priority benefit of U.S. provisional application No. 61/505,505, filed Jul. 7, 2011, and titled "Methods and Systems for Aggregating and Sharing Digital Content Associated with Social Events." The above referenced application is hereby incorporated by reference in its entirety.

FIELD OF THE INVENTION

This disclosure relates generally to transmission of digital information and, more particularly, to methods and systems for aggregating and sharing digital content associated with social events.

DESCRIPTION OF RELATED ART

File sharing services are widely used by users to upload images and videos captured with mobile devices. Other users, who have access to such content online, can view the uploaded images and videos. A user may define privacy rules and indicate whether the content is publically available to all visitors or whether it can be shared through a specific group of friends or connected members.

Conventional file sharing services can be used to share images of sport events, parties, conferences, meetings, and the like between associated participants. Typically, an image or a video is captured with a mobile phone, a digital camera, a laptop, or the like and uploaded to a website at a later time. Other users may then review and download the uploaded content.

Such file sharing services become especially useful when participants live in different cities, states, or countries, and generally, it creates a great possibility to view or download related content by any participant. In many instances, such web sharing services may be a part of so these social media sites like social networking sites, blogging sites, file sharing sites, and so forth.

Even though a user can upload files to a folder named after a specific event, the files are typically uploaded without being otherwise associated with the depicted events. This way of storing and sharing files makes managing images and videos difficult, especially when the folders comprise hundreds or even thousands of files such that the user may have to sift through a great amount of irrelevant information to find relevant files. For example, birthday party attendants who wish to find themselves on photos uploaded to a file sharing website may have to sort through hundreds of images.

Furthermore, some social events, such as business meetings or conferences, may be photographed by multiple participants. Each of them may take photos and store these photos at different file sharing sites. As a result, it may be difficult for other participants to view or download all photos taken at an event as they will need to access multiple sites and may not know where to look.

Additionally, some users may wish to find one or more specific people who attended the same social event. Conventionally, it is a time consuming and complex process for a user to sort through all photos or videos in order to find specific people.

Participants of a social event may also wish to establish privacy rules for sharing media content depicting the event. Currently, participants are limited to establishing privacy rules with respect to the content they upload themselves, but not with respect to the content uploaded by others.

SUMMARY OF THE CLAIMED INVENTION

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

A computer-implemented method for sharing digital media content by a server within a communication network may include a set of user devices receiving digital media content from one or more user devices associated with one or more users, determining one or more parts of the digital media content associated with a social event, aggregating the one or more parts associated with the social event to produce aggregated digital media content, and facilitating access to the aggregated digital media content by the one or more users.

The digital media content may include a digital photo, an image, a text, audio, and a video. The user device may include a digital camera, a video camera, a computer, a cellular phone, or a personal digital assistant (PDA). The social event may include a conference, a game play, or a leisure event.

The method may further include obtaining contextual information related to the digital media content. The contextual information may include a tag, a time, a date, a geographical location, a comment, social event data, and information related to one or more individuals or objects presented in the content. Determining parts of the digital media content associated with the social event may be based on the contextual information. Determining parts of the digital media content associated with the social event may include receiving a user request to associate the digital content with the social event.

The method may further include receiving privacy instructions from users recognized in the photo or video, with the privacy instructions including a restriction to share content and a modification of the photo or video.

The method may further include generating a website to share the media content associated with the social event. The method may further include implementing an image recognition process for the received digital media content and recognizing one or more individuals captured on a photo or a video, wherein the photo and the video relate to the digital media content. The image recognition process may be based on the contextual information.

The method may further include filtering parts of the aggregated digital media content based on contextual information, a user selection, a privacy instruction, or a user's personal information.

The method may further include determining users associated with the social event, with the determination based on the received digital media content, contextual information, or image recognition results.

The method may further include prompting a user associated with the social event to provide one or more of digital content, a comment, or feedback.

In further exemplary embodiments, modules, subsystems, or devices can be adapted to perform the recited steps. Other features and exemplary embodiments are described below.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
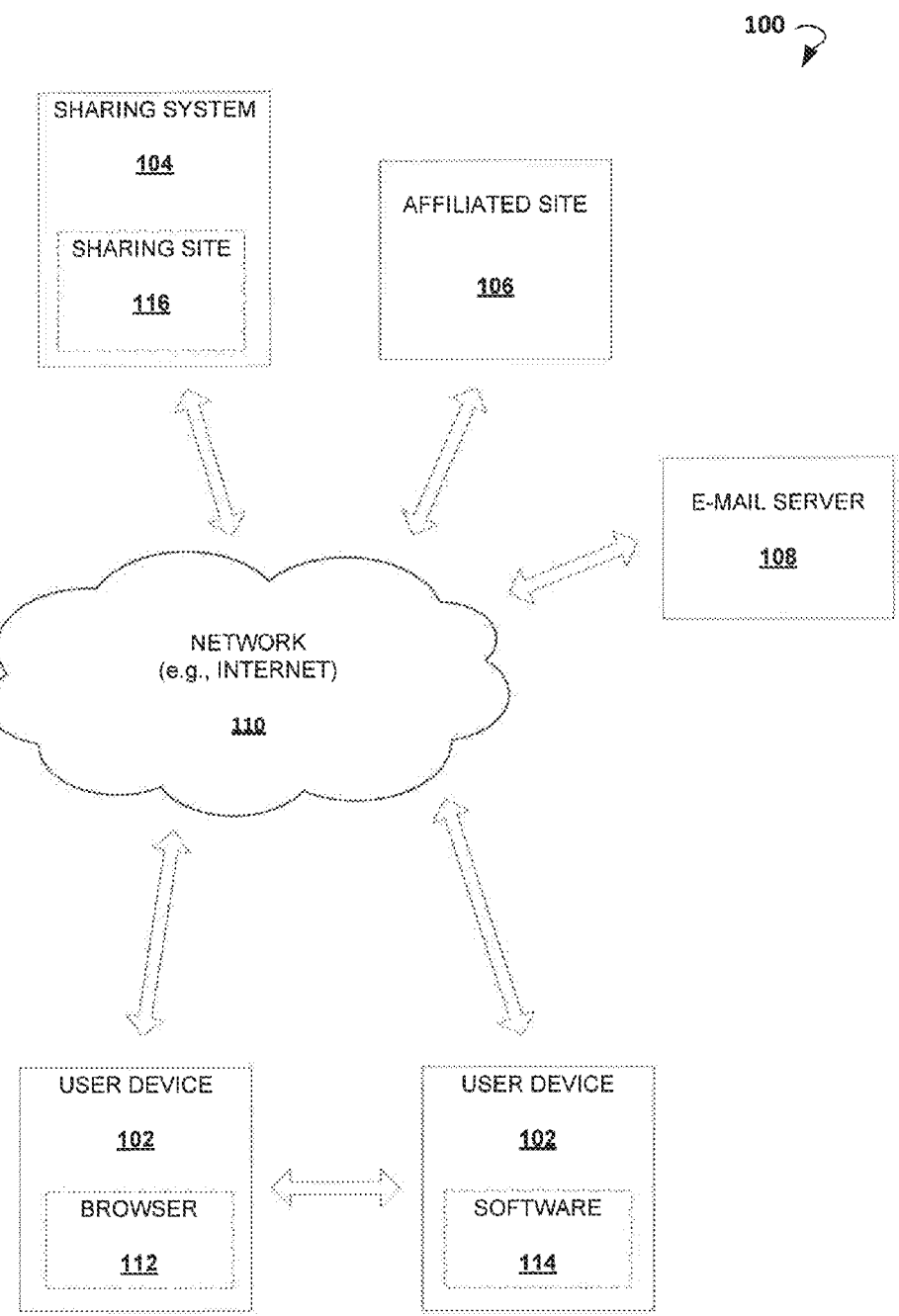
FIG. 1 shows a block diagram illustrating a system environment suitable for aggregating and sharing digital content.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The embodiments described herein relate to methods for aggregating and sharing digital content associated with social events. The methods may be implemented within a network such as the Internet.

According to the example embodiments discussed below, participants of a social event may generate digital content such as photos, videos, audio, text, and so forth. The digital content may be generated by personal mobile devices including one or more of cellular phones, smart phones, laptops, computers, digital cameras, and the like. The captured digital content may be associated with the social event. As used herein, the term "social event" may refer to any type of an event involving a group of people. Typical social events may include conferences, meetings, parties, shows, sporting events, business meetings, and so forth.

There may be more than one way of associating captured content with a social event. In one example embodiment, a user may manually input social event information at a user device and indicate or set what content captured or to be captured relates to the social event. In one example embodiment, the captured content is tagged to denote its relation to the social event. For example, a user attending a party may set a digital camera so that all photos taken with the digital camera are automatically tagged to indicate their relation to the party. Thereafter, the user may sort the taken photos by filtering for those that relate to the party.

In another example embodiment, a social event can be automatically detected. Captured content such as photos, videos, and audio may be analyzed for related parts. For example, captured photos may be subjected to image recognition process. As a result, one or more individuals can be recognized and invited to share and aggregate digital content via a network.

Alternatively, a user may manually indicate which parts of the captured photos relate to specific individuals or objects. If a user camera (or mobile phone, laptop, etc.) indicates that two or more photos are taken within the same environment (same place, same party, etc.) and/or one or more of these individuals are captured on two or more photos, the user camera may assume that the captured photos relate to the same social event. Accordingly, the camera may suggest that the user turn on a corresponding operating mode to associate the captured photos with the social event.

There may be other ways to automatically define a social event. In some exemplary embodiments, the user device may determine that there is a similar active device within a certain predetermined distance. Then, both devices within the certain predetermined distance may invite their respective users to tag pictures as taken at the social event. Alternatively, the user device may indicate that another device is within a certain predetermined distance (e.g., 20 feet) and invite its user to generate digital content related to the social event.

The captured photos or videos (in other words, digital media content) may be tagged and associated with one or more social events on the user device or a remote server. The digital media content may also contain contextual information such as titles, a time, a date, conditions, a location (e.g., GPS coordinates), information related to recognized objects or individuals, and so forth.

The user may then upload the captured digital content to a remote server. The content can be hosted on a website and accessed by any person or by a specific group of people, depending on the privacy rules set. The users may sort uploaded photos and aggregate only those which relate to the same social event, or which contain a specific individual, or the like. For instance, among thousands of uploaded photos, the users may easily sort only those in which they appeared.

Furthermore, according to exemplary embodiments disclosed herein, the remote server may aggregate digital content from a number of users participating in the same social event. Different users may upload to the remote server their photos and videos from the event they attended. Accordingly, the remote server may selectively aggregate content from different sources within a single place (site). Alternatively, upon request of the user, the remote server may perform such aggregation. The users, therefore, are provided with a useful tool to sort photos or videos from different sources and select only those in which they are interested. For example, the users may see and download photos in which they appear that were previously uploaded by other participants.

In yet other embodiments, the remote server may also perform image recognition of the digital content and automatically determine that specific photos/videos relate to the same social event. The owners of the content may then be notified or invited to tag such content and associate it with the social event. Furthermore, the image recognition process may be used to determine specific individuals. Users may manually tag photos having recognized individuals and assign names, nicknames, and the like. In addition, personal information of the users or recognized individuals can be assigned to the uploaded content and can be used to sort photos. In some embodiments, personal information can be retrieved from other affiliated sites, such as social networking sites. Mentioned information assigned to the uploaded content may be used to aggregate and filter content stored on the site. Thus, users can use sorting to filter photos or videos in which searched-for individuals appear.

According to additional aspects, the users may set privacy rules within the remote server and/or site hosting the content. In one example, one user may establish privacy rules for all photos in which he/she appeared. In other words, even if content is uploaded by other users (other participants of the same social event), and it is recognized that the certain user is shown in specific photos, these photos can be modified (e.g., blurred in part where the first user is shown, deleted, blocked, and so forth) according to the privacy rules preset by this certain user. Various privacy rules can be set by individuals and groups, as can be readily understood by those skilled in the art.

Therefore, embodiments disclosed herein relate to a useful tool that enables people to easily aggregate and share digital content associated with social events via a network. The aggregation can be performed from different sources in association with the same social event. The content, such as photos and videos, can be subjected to an image recognition process to define one or more individuals. Shared content may be filtered to sort only those photos or videos in which social event participants appear. In addition, users may set privacy rules to hide those parts of photos or video in which they appear.

The embodiments described herein can be implemented by various means, depending on the application. For example, the embodiments may be implemented in hardware, firmware, software, or in a combination thereof. For hardware implementation, the embodiments may be implemented with processors, controllers, micro-controllers, microprocessors, electronic devices, other electronic units designed to perform the functions described herein, or a combination thereof. Memory can be implemented within a processor or external to the processor. As used herein, the term "memory" refers to any type of long term, short term, volatile, nonvolatile, or other storage device and is not to be limited to any particular type of memory or number of memories, or type of media upon which memory is stored. For firmware and/or software implementation, the embodiments can be implemented with modules such as procedures, functions, and so on, that perform the functions described herein. Any machine-readable medium tangibly embodying instructions can be used in implementing the embodiments described herein.

Referring now to the drawings, FIG. 1 shows a block diagram illustrating a system environment 100 suitable for aggregating and sharing digital content. The system environment 100 comprises one or more user devices 102, a sharing system 104, one or more affiliated sites 106, one or more e-mail servers 108, and a network 110. The network 110 may couple the aforementioned modules.

The network 110 is a network of data processing nodes interconnected for the purpose of data communication, which may be utilized to communicatively couple various components of the environment 100. The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port, such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, an SCSI (Small Computer Systems Interface) connection, a USB (Universal Serial Bus) connection or other wired or wireless, digital or analog interface or connection, mesh or Digi® networking.

As used herein, the term "user device" refers to a computer, a laptop, a tablet computer, a portable computing device, a PDA, a digital camera, a handheld cellular phone, a mobile phone, a smart phone, a cordless telephone, a handheld device having wireless connection capability, or any other electronic device suitable for capturing photos, videos, or audio. The user devices 102 may also receive or transmit data such as captured photos or videos via a cord or cordless network. In one example, the user devices 102 may be configured to browse websites or access remote servers via a network. A user device 102 can also be configured to determine its geographical location based on Global Positioning System (GPS) signals, Internet Protocol (IP) addresses, base station information, and so forth.

The user devices 102 can be used to generate digital media content such as photos, images, videos, audio, text, and so forth, and also to transmit the content via the network 110. The user devices 102 can also be used to access the content previously stored at a remote database (e.g., at the sharing system 104).

In some embodiments, the user devices 102 may comprise a browser 112 providing the ability to browse and interact with sites on the Internet. In some other embodiments, the user devices 102 may comprise software 114 to communicate with the sharing system 104. In one example, the software 114 is a mobile application embedded in the user device 102.

The sharing system 104, according to example embodiments disclosed herein, may be configured to receive digital content from the user devices 102, store the digital content, and share it with the same or other user devices 102 in an enhanced manner. Digital content can be accomplished with additional contextual information such as file names, titles, brief descriptions, times, dates, tags, and so forth. Furthermore, contextual information may also comprise results of image recognition (i.e., information on recognized individuals captured in a photo or video).

The sharing system 104 can be implemented as a server having multiple modules and databases. In one example, the sharing system 104 may host a site providing access for its visitors to the system. In other words, the site enables visitors to upload or download digital content to the sharing system 104. The sharing system 104 is described in detail below with reference to FIG. 2.

According to example embodiments disclosed herein, the one or more affiliated sites 106 may include any website on the Internet that may provide an access to the sharing system 104. In one example, the affiliated sites 106 have a gateway to the sharing system 104 to enable visitors of these sites to upload or download digital content to the sharing system 104.

The e-mail server 108 may transfer e-mail messages from one computer to another computer, using client-server application architecture. The e-mail server 108 may be used by one user device 102 to send a message to another user device 102, or may be used by the sharing system 104 to send messages to the user devices 102.

Figure 2:
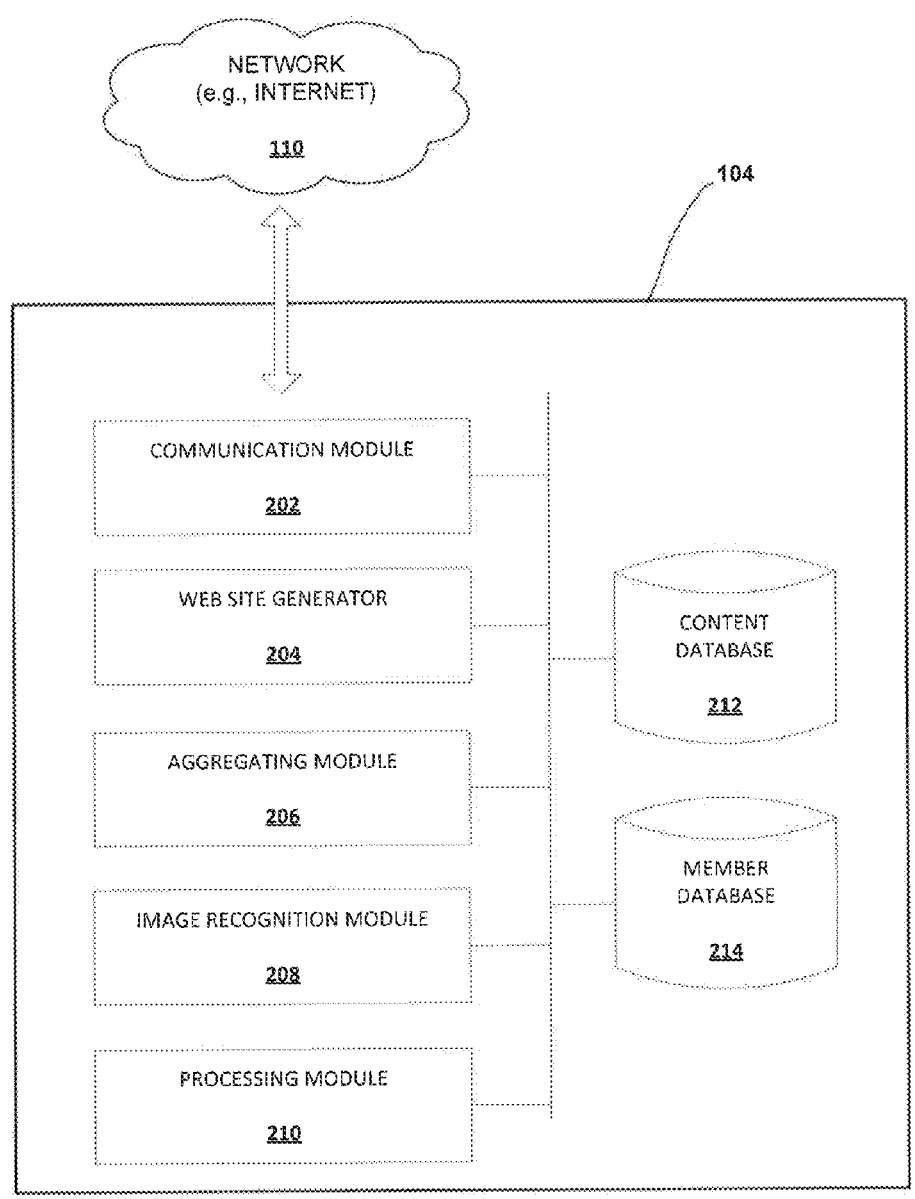
FIG. 2 is a diagram of a sharing system.

FIG. 2 is a diagram of the sharing system 104. In this embodiment, the sharing system 104 may include a communication module 202, a website generator 204, an aggregating module 206, an image recognition module 208, a processing module 210, a content database 212, and a member database 214. In other embodiments, the sharing system 104 may include additional, fewer, or different modules for various applications. Furthermore, all modules can be integrated within a single system, or, alternatively, can be remotely located and optionally be accessed via a third party.

The sharing system 104 may be implemented as hardware having software installed thereon that implements the steps necessary to operate the sharing system according to example embodiments disclosed herein. The sharing system 104 may also host a content sharing site 116 directed, among other things, to store, aggregate, and share digital content in an enhanced manner as described further.

According to example embodiments, the users (social event participants) may first register with the sharing site 116 and create a member profile. The membership details may be stored in the member database 214. The membership profile stored in the database 214 may store personal information, such as a name, a nickname, user credentials, a representative picture/photo/logo, an address, a phone number, a fax number, an e-mail address, a web address, credentials of associated member profiles of social media sites, or any other form of contact and personal information.

The users may manage their profiles (personal webpages within the sharing site 116) in the member database 214. In addition, the sharing site 116 may manually or automatically access the one or more affiliated sites 106. The sharing site 116 may also enable communication between users. According to another example, the sharing site 116 may allow the users to share information via the one or more affiliated sites 106.

The users may also upload digital content to the sharing system 104, which in turn can be stored in the content database 212. The users may also generate web pages with the help of the sharing system 104, which are associated with the uploaded content. The web pages may provide access to the content stored in the content database 212 to one or more different users. Accordingly, each generated web page may relate to the content of one social event. In addition, web pages can be managed by one or more users. The web pages may aggregate content from one or more users, and this content can be sorted or filtered according to example embodiments disclosed herein.

The communication module 202 may be configured to connect the sharing system 104 to the one or more user devices 102, the one or more affiliated sites 106, and the one or more e-mail servers 108 via the network 110. The connection and data transfer may be provided via an Application Programming Interface (API). The communication module 202 is also configured to provide communication functionality between all modules of the sharing system 104.

In particular, the communication module 202 may receive the user requests to store digital content to the member database 214, manage member profiles in the database 212, access and manage content stored in the content database 212, and the like. The communication module 202 can process all such user requests.

Pursuant to the example embodiment, the website generator 204 may be configured to generate websites comprising the uploaded content. The websites may contain content originating from one source (i.e. one user), or contain content aggregated from different sources (i.e. obtained from different users). Aggregation of the content can be performed based on assigned contextual information. In other words, aggregation can be performed such that all content related to the same social event is collected on a single website. Alternatively, aggregation can be performed relative to those photos/videos, which comprise certain individuals or objects. It should be apparent that different aggregation methods may be applied.

The websites may also comprise functionality to manage the digital content. For example, different users, who have access to such websites, may download content, add commentary, re-post to any affiliated website (e.g., social networking website), and so forth.

The aggregating module 206 is configured to aggregate content stored in the content database 212. Specifically, upon request of a user, the aggregating module 206 may sort and deliver to the user (or to the generating website) specific parts of the content. The sorting process can be based on contextual information assigned to every piece of the content. In particular, the aggregating module 206 may sort photos or videos (or other parts of the digital content) that relate to the same social event, show the same individuals or objects, were captured in one day and/or in one location, or the like. The aggregation process can be performed using different methods, which are discussed below.

The image recognition module 208 is configured to selectively recognize individuals, objects, characters and the like on photos and videos stored in the database 212. The recognition process can be any one of those known in the art, and specifically it may recognize individuals by their faces, appearance, and other factors. The users may be prompted to facilitate the recognition process. For example, users may define an individual in a photo or add a description of the recognized objects. The results of recognition can be added to the contextual information assigned to the content. Further, this information can be used to aggregate or sort content.

The processing module 210 is configured to analyze the uploaded content and determine parts of the content related to the same social events. In one example, when a user uploads content (e.g., photos) to the sharing system 104, the processing module 210 may analyze the contextual information of the content to determine which parts of the content (i.e., photos) relate to the same social event. In other words, if the processing module 210 determines that photos were captured in one place, in one day, by one user, have the same tags, and so forth, it may be assumed that these photos relate to a social event, and the user is prompted to confirm it. The processing module 210 may analyze not only the content uploaded by one user, but also the content uploaded by others.

The content database 212 may store content uploaded by users. This database may also comprise contextual information assigned to the content. The member database 214 may store membership-related information, such as user profiles, personal information, and so forth. The users may access the databases 212 and 214 via the communication module 202 to review, modify, or delete information stored therein.

Figure 3:
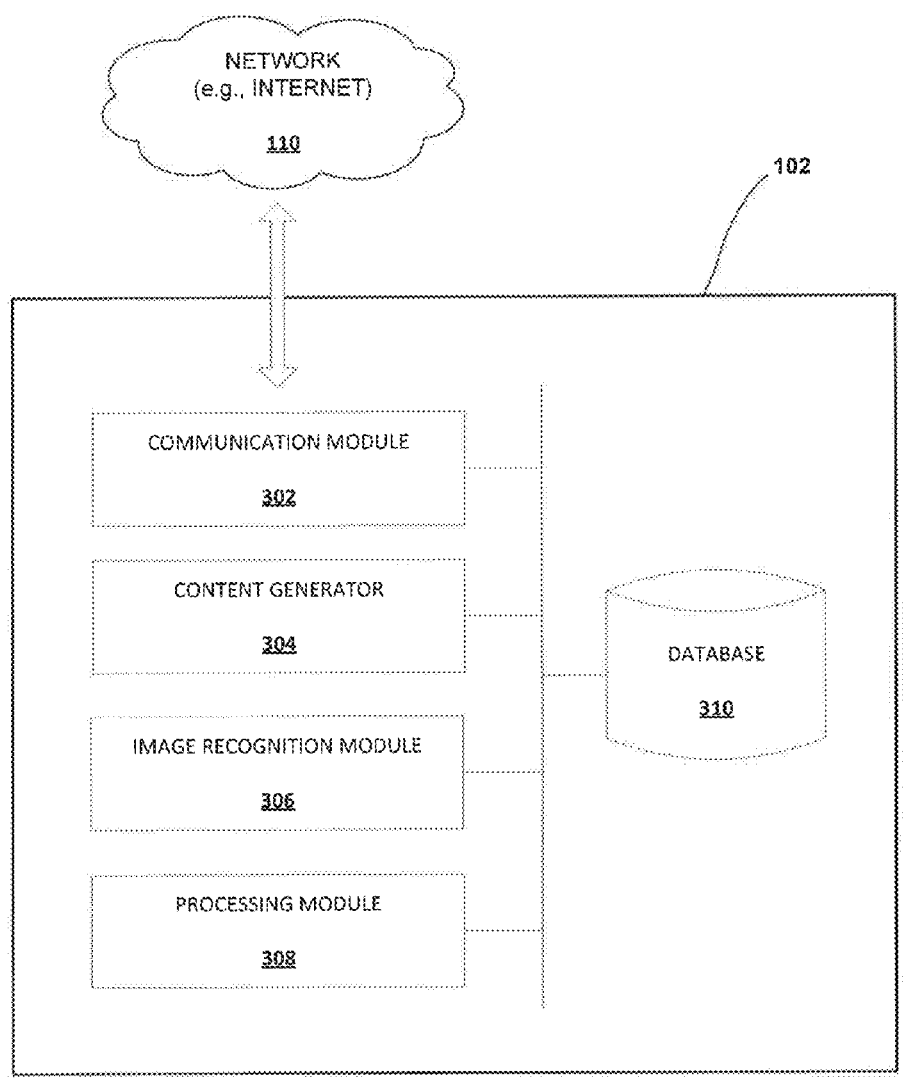
FIG. 3 is a diagram of a user device.

FIG. 3 is a diagram of the user device 102. In this embodiment, the user device 102 may include a communication module 302, a content generator 304, an image recognition module 306, a processing module 308, and a database 310. In other embodiments, the user device 102 may include additional, fewer, or different modules for various applications. Furthermore, all modules can be integrated within a single system, or, alternatively, can be remotely located and optionally be accessed via a third party.

The user device 102 may be implemented as hardware having software installed thereon that implements the steps necessary to operate the sharing system according to example embodiments disclosed herein.

The communication module 302 may be configured to couple the user device 102 to the sharing system 104, the one or more other user devices 102, the one or more affiliated sites 106, and the one or more e-mail servers 108 via the network 110. The coupling and data transfer may be provided via an API. The communication module 302 is also configured to provide communication functionality between all modules of the device 102.

In particular, the communication module 302 may generate user requests to store digital content to the content database 212 located at the sharing system 104, manage member profiles in the member database 214, access and manage content stored in the content database 212, and the like.

The content generator 304 may be configured to generate digital media content such as photos, videos, audio, and text. In one example, the content generator 304 is a digital camera embedded in the user device 102. However, the content generator 304 may be an input device to generate text data. The content generated by the content generator 304 may be added with contextual information such as title, file name, date, time, name of the device generating such content, and so forth.

The image recognition module 306 may be configured to selectively recognize individuals, objects, characters, and the like on photos and videos stored in the database 310. The recognition process can be any one known in the art, and specifically it may recognize individuals by their faces, appearance, and other factors. The users may be prompted to facilitate the recognition process. For example, users may define an individual on a photo or add a description of the recognized objects. The results of recognition can be added to the contextual information assigned to the content. Further, this information can be used to aggregate or sort content.

The processing module 308 is configured to analyze the uploaded content and determine parts of the content related to the same social events. In one example, when a user uploads content (e.g., photos) to the sharing system 104, the processing module 308 may analyze contextual information of the content to determine which parts of the content (i.e., photos) relate to the same social event. In other words, if the processing module 308 determines that photos were captured in one place, in one day, have the same tags, and the like, it is assumed that these photos relate to a social event, and the user is prompted to confirm it. Furthermore, the processing module 308 may determine that similar devices exist within a proximity distance from the user device 102. This determination can be done by ascertaining a wireless environment, location (e.g., GPS coordinates), IP address, and so forth.

The content database 310 may store content generated by the user device 102. This database 310 may also comprise contextual information, which is assigned to the content.

Figure 4:
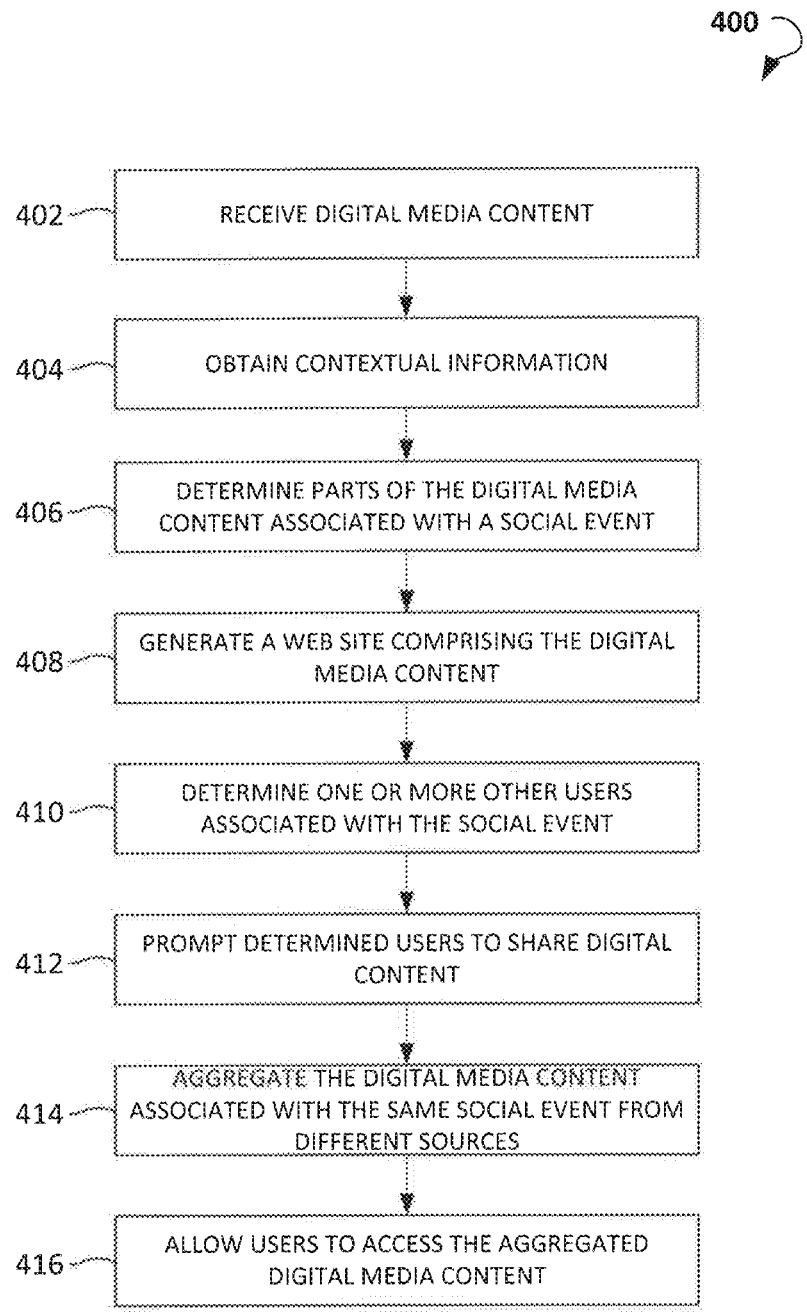
FIG. 4 is a process flow diagram of a method for sharing digital content by a server within a communication network comprising a set of user devices.

FIG. 4 is a process flow diagram showing a method 400 for sharing digital content by a server in a communication network comprising a set of user devices. The method 400 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the sharing system 104.

The method 400 can be performed by the various modules discussed above with reference to FIG. 2. Each of these modules can comprise processing logic. It will be appreciated by one of ordinary skill that examples of the foregoing modules may be virtual, and instructions said to be executed by a module may, in fact, be retrieved and executed by a processor. The foregoing modules may also include memory cards, servers, and/or computer discs. Although various modules may be configured to perform some or all of the various steps described herein, fewer or more modules may be provided and still fall within the scope of example embodiments.

As shown in FIG. 4, the method 400 may commence at step 402 with the sharing system 104 receiving digital media content from a user device 102. Receiving can be performed in any suitable manner. The content at this step may also be stored in the content database 212.

At step 404, the sharing system 104 obtains contextual information related to the received content. In one example, such contextual information is part of the content (e.g., embedded therein). In another example, the sharing system 104 may generate or update such contextual information based on a member profile (e.g., content can be assigned with information related to the member profile of the user who uploaded the content). Alternatively, the sharing system 104 may utilize a combination of these techniques.

At step 406, the sharing system 104 may determine parts of the content associated with a social event. It may be all uploaded content files related to a single social event, or only some of them. The determination process can be implemented differently. In one example, the sharing system 104 may analyze the contextual information assigned to the content and reveal that captured photos or videos relate to the same social event. Alternatively, or in addition, the sharing system 104 may receive a user selection of specific parts of the content as being related to the same social event. For example, the user may be prompted to select those files that relate to the same social event. In yet another example, the sharing system 104 may perform image recognition process to reveal individuals, objects, and the like. Based on the image recognition process, it may be concluded that certain images relate to the same social event. For example, as a result of the image recognition, the sharing system 104 may determine that one individual appears two or more times on different photos or videos. Alternatively, it may be revealed that all photos/videos were captured within the same environment (e.g., in one room). Those skilled in the art would readily understand that different approaches are applicable to making an assumption that a number of files relate to the same social event.

Figure 6:
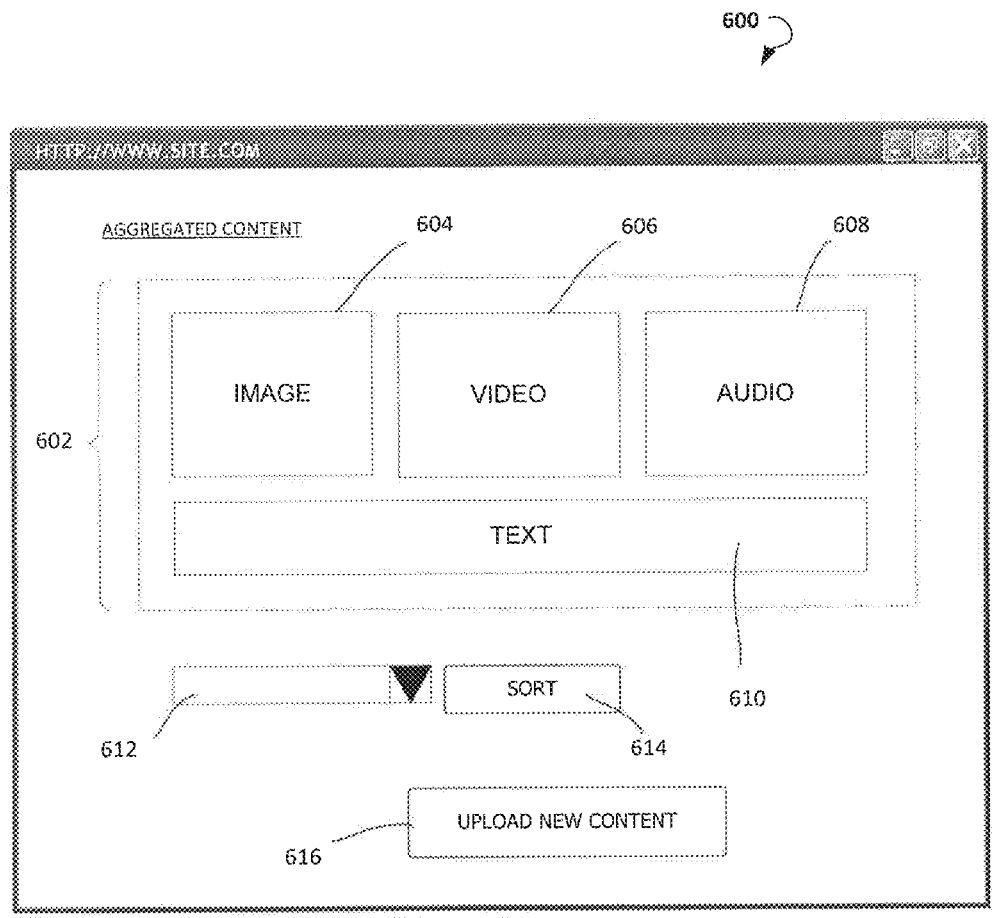
FIG. 6 shows a graphical user interface aggregating digital media content from one or more sources.

In step 408, the sharing system 104 may generate a website having one or more web pages related to the received content. In particular, the website may comprise a part of or the entire content received at step 402. In one example, the website may comprise only those content files that relate to the same social event. The generation of the website may be performed in line with a user's predetermined criteria or selections in any suitable manner. An example of such a website is shown in FIG. 6. The website may become public and can be accessed by any users or a preset group of users to share the content among them.

At step 410, the sharing system 104 may determine one or more other users associated with the social event. In particular, such users may be defined through analysis of the content, contextual information assigned to the content, results of the image recognition process, and so forth. It can also be determined that the determined users are registered within the sharing website 116. If they are not registered, they can be invited to join the community and register with the website 116.

At step 412, the users determined as being related to the same social event may optionally be prompted to review the content of the generated website, to share their content, to register with the sharing website, to provide their personal information, to leave comment or feedback, to set their privacy instructions for publishing such content on the Internet, and so forth. Any individual recognized on the stored photos or videos can assign the privacy instructions. The privacy instructions may comprise one or more of restrictions on sharing content in which they appear and visual modification of the photos or video (e.g., blurring parts of the photos in which they appear).

At step 414, the sharing system 104 may intelligently aggregate the digital media content associated with the same social event from one or more sources. More specifically, in one example, the sharing system 104 may aggregate the received content parts from the one user such that these parts relate to the single social event. Alternatively, if it was previously determined that there were several attendants at the social event, and they have also uploaded their content related to the same social event, the sharing system 104 may intelligently aggregate this content from all such users. According to example embodiments disclosed herein, the website generated at step 408 may be updated to include the content from all these sources. In some other embodiments, the content can be aggregated from different databases, including the content database 212, the user device database 310, the databases of any affiliated website 106, and the like. For instance, if some participants of the social event are not registered with the sharing website 116, and have their accounts at some affiliated social media websites 106 (like social networking websites), the sharing system 104 may be configured to aggregate the relevant content from these sites (e.g., it may access member profiles and download photos or video previously stored within these affiliated sites). In general, any suitable approach for aggregating the content from different sources can be applied.

At step 416, users are provided access to the generated website having aggregated content. Different users may be provided with different levels of access to the content. One may review content only, while other ones may be allowed to add, update, or delete content depending on the application.

Thus, a single website comprising aggregated content related to the same social event can be generated. This becomes useful when attendants of this event live in different cities, states, or countries, so that they do not need to travel from site to site to review all photos or videos captured during the social event. In addition, the users may apply filtering to the aggregated digital media content included in the generated website. The filtering process can be based on the contextual information, user selections, privacy instructions, membership parameters, and so forth.

In one example, the user may filter the aggregated content such that it comprises only those parts (or files) that relate to a specific individual or object. For instance, the user may wish to sort all photos/videos on the website to see only those in which he/she appears. If this user is recognized on photos/videos (which can be determined by processing contextual information), then only those files can be provided for reviewing. Accordingly, the generated website may dynamically update depending on the users' wishes.

In yet another example, users indicated or determined as being presented on the uploaded photos/videos may be prompted to set privacy instructions in regards to sharing information about them. For instance, these users may allow anyone access to review their images. Alternatively, the users may block access to the corresponding photos/videos, or those parts of photos/video may be modified to be blurred, colored, excluded, or the like. Such privacy instructions related to specific users appearing on the photos/videos may be attached to the contextual information and stored along with the content in the content database 212, or attached to the member profile stored in the member database 214. Thus, users may easily set privacy instructions that can be applied to both content uploaded by this user and the content uploaded by others.

Figure 5:
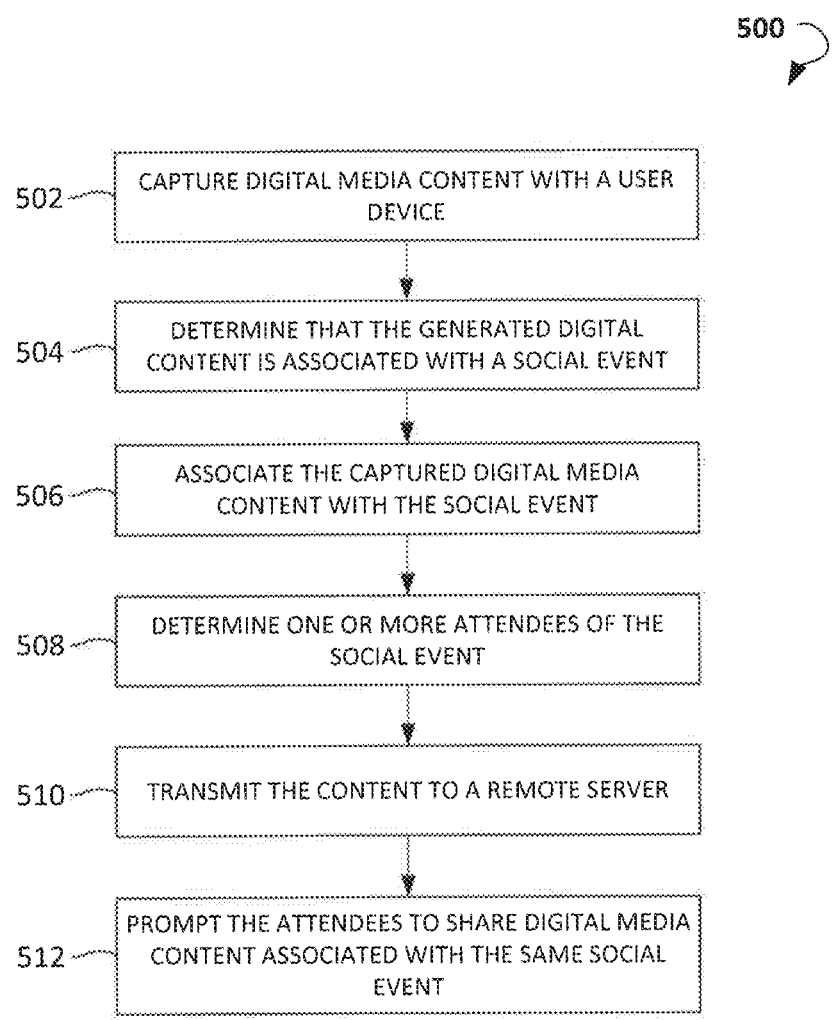
FIG. 5 is a process flow diagram showing a method for sharing digital content within a communication network comprising a set of user terminals.

FIG. 5 is a process flow diagram showing a method 500 for sharing digital content in a communication network comprising a set of user terminals. The method 500 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the sharing system 104.

The method 500 can be performed by the various modules discussed above with reference to FIG. 3. Each of these modules can comprise processing logic. It will be appreciated by one of ordinary skill that examples of the foregoing modules may be virtual, and instructions said to be executed by a module may, in fact, be retrieved and executed by a processor. The foregoing modules may also include memory cards, servers, and/or computer discs. Although various modules may be configured to perform some or all of various steps described herein, fewer or more modules may be provided and still fall within the scope of exemplary embodiments.

As shown in FIG. 5, the method 500 may commence at step 502 with the user device 102 capturing digital media content. The digital media content may comprise digital photos, images, text, audio, videos, and so forth. The user device 102 may be a digital camera, a video camera, a computer, a cellular phone, a PDA, or any other suitable device with ability to capture photos, video and audio. At this step, the generated content may be temporarily stored in the database 310.

At step 504, the user device 102 may determine that the captured digital content is associated with the same social event. Such determination can be performed variously.

In one example, the user may merely indicate (select) that the captured content relates to a certain social event. The user may define its name and assign other relevant information such as date, time, location, participant names and their appearance on captured photos/video, commentary, and other information, which is defined as contextual information in terms of this document. The user may also set a mode of the user device 102 such that the further generated content is automatically assigned with necessary tags denoting their relation to the social event.

In another example, the user device 102 may automatically determine that the captured content relates to the same social event. For this process, the user device 102 may perform an image recognition process to selectively recognize individuals and objects on photos and videos. The recognition process can be any one known in the art suitable for recognizing individuals by their faces, appearance, and other factors. Accordingly, when user device 102 determines that the same individual is captured on two or more photos/videos, or all photos/videos are captured within the same environment (in one room, in one place), the user device 102 may assume that a social event took place. The user may then be prompted to confirm the assumption and assign corresponding contextual information to such content.

In still another example, the user device 102 may determine its geographical location based on data received from a GPS receiver embedded within the user device, or received from databases of a cellular network, or the like. When more than a certain number of pictures/videos are taken from one place, the user device 102 may determine that the captured content relates to the same social event.

In another example, the user device 102 may determine the presence of similar devices within a proximate distance. The determination process can be of any suitable technique including Bluetooth, Wireless Ethernet, Wi-Fi, WiMax, or other techniques. When the user device 102 determines that similar devices are located within the proximity distance (e.g., twenty or less feet) for a certain time period (e.g., fifteen or more minutes), it may be assumed that a social event is taking place. Again, the user of the user device may be prompted to define any content generated or to be generated as being related to the social event.

Those skilled in the art would understand that different approaches for determining the presence of the social event can be applied, and they are not limited by those that are discussed herein.

At step 506, the captured content is associated with the social event. In other words, the content may be assigned with tags or contextual information to indicate a relation of the content to the social event. As mentioned, the contextual information may comprise, among other things, information that a particular file relates to a certain social event, time, date, location, as well as containing titles, a name of the social event, data about recognized individuals, and so forth.

At step 508, the user device 102 may determine one or more attendees of the social event. Primarily, such a determination can be based on the same algorithms as discussed with reference to the step 504. More specifically, the user can be prompted to indicate one or more attendees (in other words, participants, as previously mentioned) of the social event. The user may indicate parts of photos or videos in which such attendees appear. The user may also be prompted to indicate their names and personal information, or provide a link to their member profile within the sharing website 116 or any affiliated website 106 (such as any social networking site.)

In some other embodiments, the attendees may be recognized on photos/video automatically in conjunction with the image recognition process. The user may only need to assign names of the recognized individuals. In yet another example, the attendees may be determined automatically as those who have a similar user device 102 and are located within a predetermined proximity distance from the user. When such devices are within the proximity range, and they are also used to capture photos, video or audio, such devices can be considered as assigned to the attendees. Different approaches can be applied to determine the attendees.

Furthermore, according to some embodiments, the step 506 of assigning the captured content to the social event may be performed when at least one attendee is determined. Alternatively, when it is determined that the social event is taking place, the one or more attendees are defined. Information about attendees may be stored as part of the contextual information assigned to the content.

At step 510, the user device 102 may transmit the captured content along with assigned contextual information to a remote server. In one example, the remote server is the sharing system 104 as described with reference to FIG. 2. The remote server then allows different users to access the uploaded content. As mentioned, different users may be provided with different levels of access to the content depending on predetermined settings and privacy instructions of the attendees appearing in the photos or videos.

At step 512, the attendees determined as being related to the same social event may optionally be prompted to share the content captured by their user devices with the same remote server. In addition, the attendees may be requested to register with the sharing website, provide their personal information, leave comments or feedback, set their privacy instructions for publishing content on the Internet, and so forth.

FIG. 6 is a simplified illustration of a graphical user interface 600, which aggregates digital media content from one or more sources. The graphical user interface 600 may be represented as a window (e.g., a browser window) to show the aggregated content. The aggregation of the content can be performed according to the technique described with reference to FIG. 4. The graphical user interface 600 may be presented on a screen of the user device 102 via the browser 112 or as ad hoc software 114.

The user interface 600 may comprise one or more of content sections 602. Each section 602 may comprise an image 604, a video 606 (i.e., an embedded media player to play the video), audio 608 (i.e., an embedded media player to play the audio), or text 610. The section 602 may comprise one or more images, video, text, and audio.

The text 610 may optionally comprise comments, a part of contextual information (e.g., date and time of capture, location, social event data, recognized attendees, names, titles, personal information, links to affiliated websites, links to personal profiles within the sharing website 116 or any social networking site, ranks, feedbacks, and so forth).

The user interface 600 may aggregate multiple sections 602, with each section 602 originating from different users/ attendees. When the graphical user interface 600 is accessed the first time, it may comprise all content captured during certain social event. However, users are provided with the ability to sort the presented content. The user may select a preferable way for sorting from a drop menu 612, and press an actionable button 614 "Sort." Accordingly, the user may sort content by title, date, time, location, origination, recognized individuals, type of the content, and so forth.

The user interface 600 may also comprise an actionable button 616 to submit new content related to the same social event. When this button is activated, the user may be driven to a submission site to upload corresponding content. In other embodiments, the graphical user interface 600 may include additional, fewer, or different modules for various applications.

Figure 7:
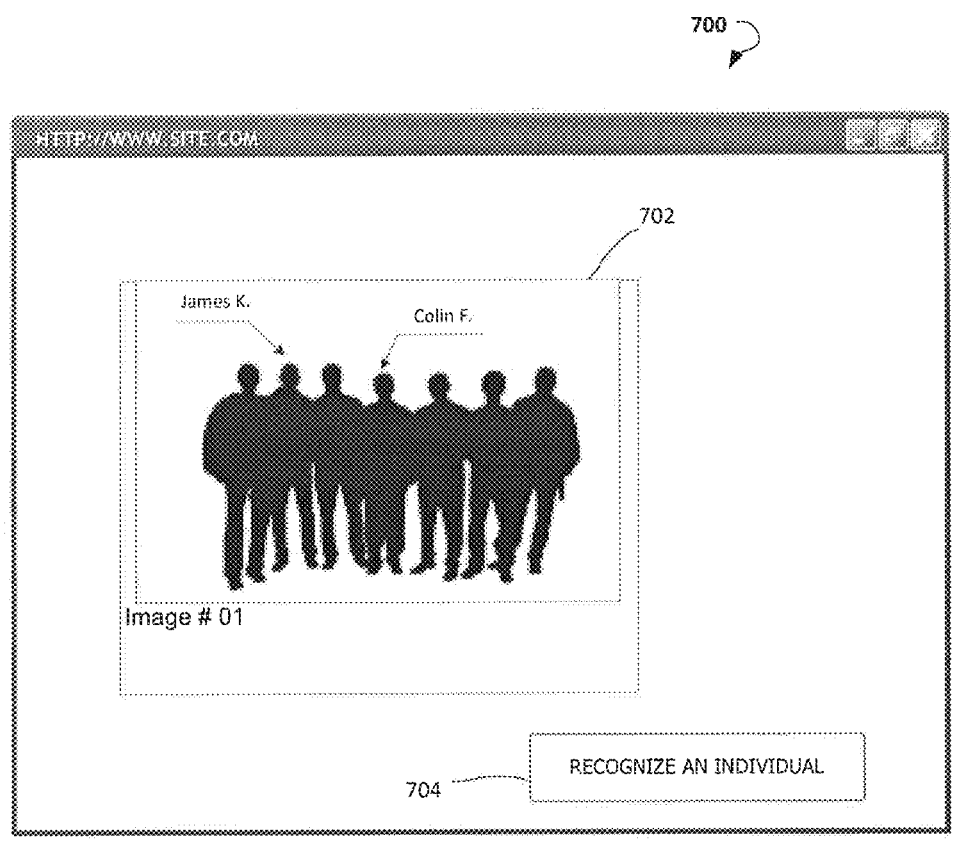
FIG. 7 shows a graphical user interface including a photo subjected to an image recognition process.

FIG. 7 is a simplified illustration of a graphical user interface 700 showing a photo 702 (e.g., section 604), which was subjected to an image recognition process. The graphical user interface 700 may be presented on a screen of the user device 102 via the browser 112 or as ad hoc software 114.

As shown, the user interface 700 may comprise a photo of a group of people. When the people in the photo are recognized, a name is attributed to each individual in the photo. The names can appear on top of the photo, and they can be presented as clickable targets, where "clickable" is another way for the targets to be "selectable." In one example, when the user clicks on (or selects) such targets, the user can be driven to a web page comprising the content from the same social event, but sorted to show all photos or videos of the selected individual.

In some embodiments, the individuals on the photo can be unrecognized or not assigned with personal information. Thus, users may be provided with an option to recognize such individuals. Accordingly, the graphical user interface 700 may comprise an actionable button 704 to indicate an individual on the photo. In particular, when the button 704 is pressed, the user is driven to select a part of the photo to indicate such individual and provide his/her personal information such as name, title, links to personal member profiles, and the like. In other embodiments, the graphical user interface 700 may include additional, fewer, or different modules for various applications.

Figure 8:
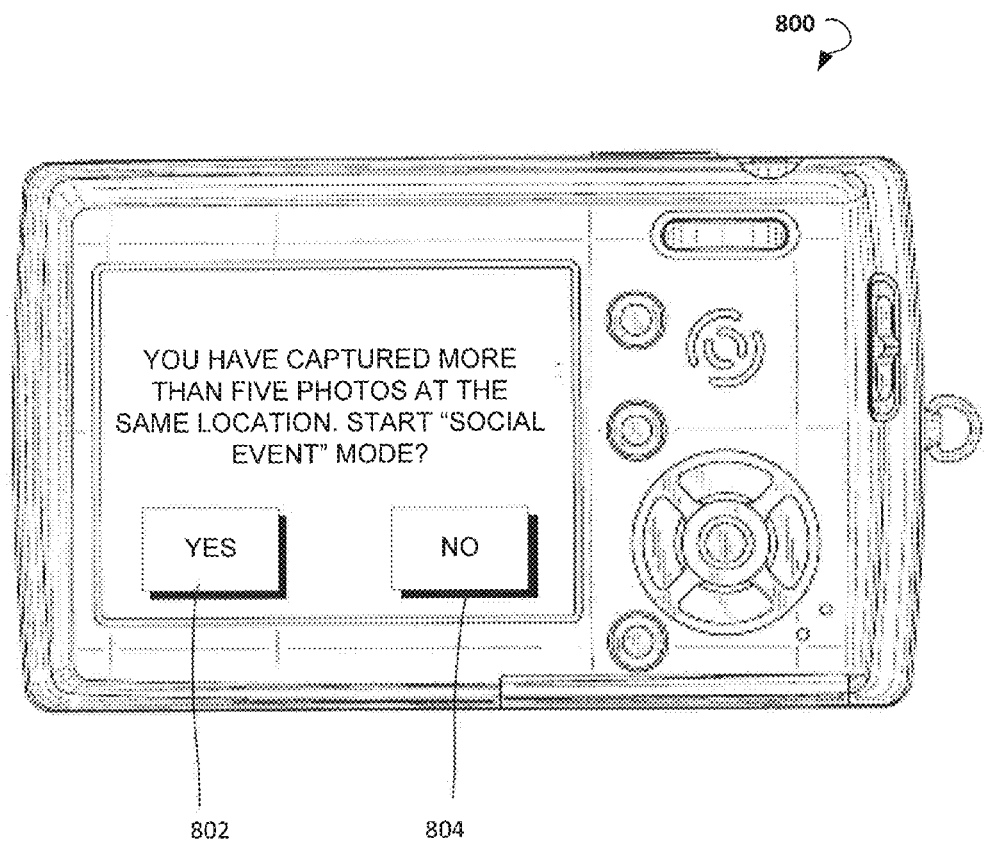
FIG. 8 shows a graphical user interface of a user device suggesting a possible social event occurrence.

FIG. 8 is a simplified illustration of a graphical user interface 800 of the user device 102 when it has determined that a social event is possibly taking place.

As shown in the figure, the user device 102 (e.g., a digital camera) has determined through an image recognition process that the user has taken more than five photos in the same place. The graphical user interface 800 prompts the user to answer if this is a social event. The user may select a "Yes" button 802 to indicate his/her desire to assign to the captured photos contextual information describing the social event and its attendees, and/or to indicate that all following photos are also related to the same social event. Alternatively, by pressing the "No" button 804, the user may continue without turning the "social mode" on. In other embodiments, the graphical user interface 800 may include additional, fewer, or different modules for various applications.

Figure 9:
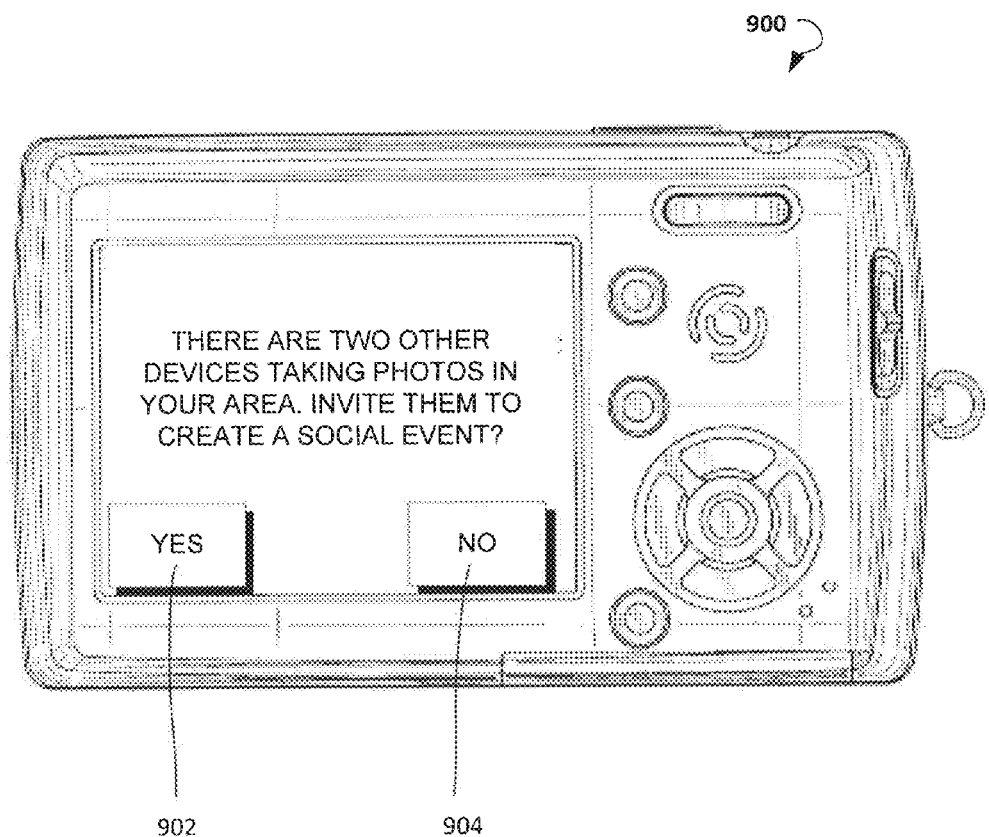
FIG. 9 shows a graphical user interface of a user device suggesting a possible social event occurrence, according to another example embodiment.

FIG. 9 is a simplified illustration of a graphical user interface 900 of the user device 102 when it has determined that a social event is possibly taking place, according to another example embodiment.

As shown, the user device 102 (e.g., a digital camera or a cellular phone) has determined that there are two similar devices within the predetermined proximity distance, which may also be taking photos of the same social event. Hence, the graphical user interface 900 may prompt the user to create a social event. The user may select a "Yes" button 902 to indicate his/her desire to create a "Social Event." If pressed, any photos captured with this device will be assigned with corresponding contextual information. In addition, the users of the nearby detected devices will also be invited to participate in the social event and to share the content they may also capture with their devices. Alternatively, by pressing the "No" button 904, the user may continue without turning the "social mode" on. In other embodiments, the graphical user interface 900 may include additional, fewer, or different modules for various applications.

Figure 10:
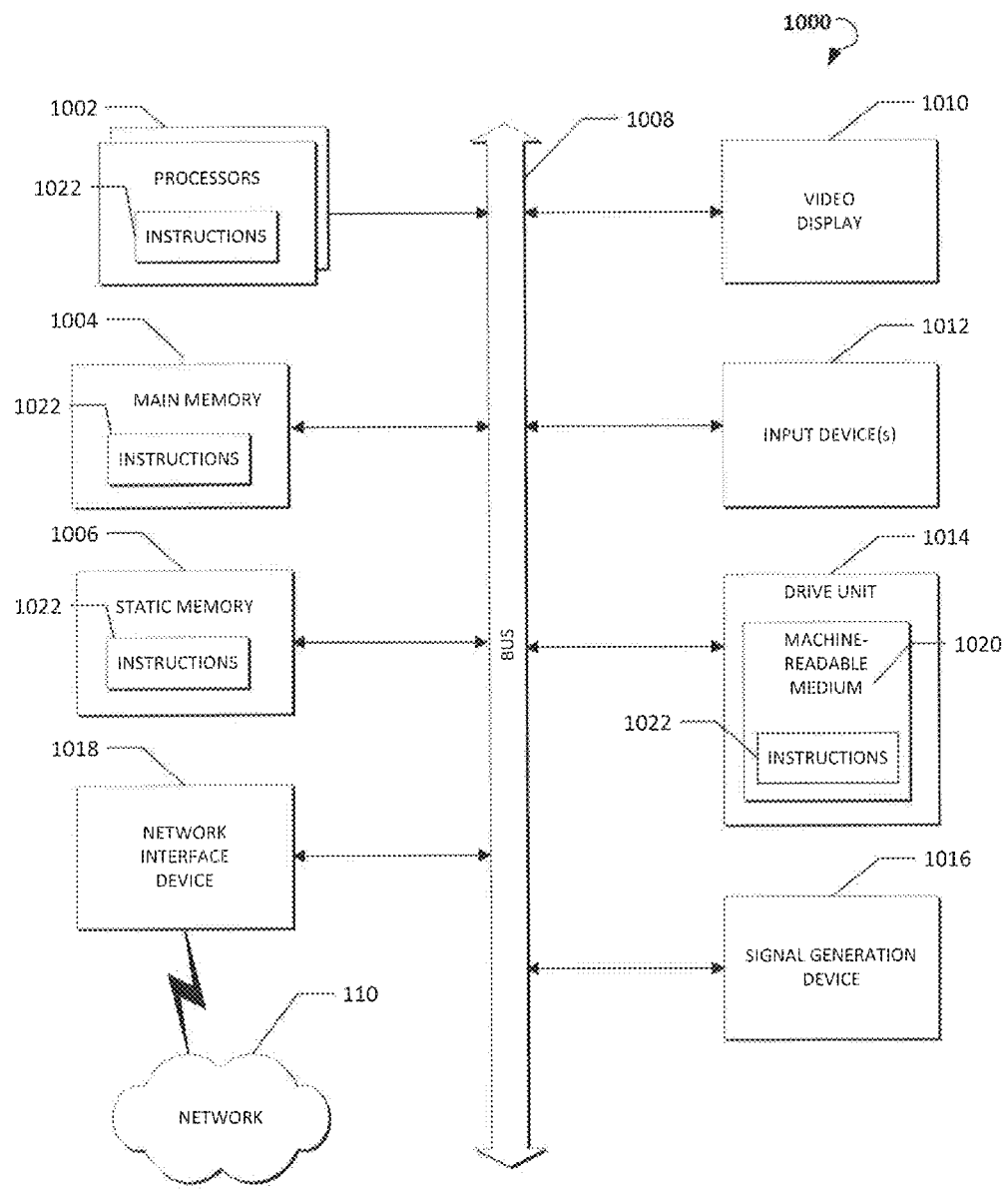
FIG. 10 is a diagrammatic representation of an example machine in the form of a computer system within which a set of instructions is executed.

FIG. 10 shows a diagrammatic representation of a computing device for a machine in the example electronic form of a computer system 1000, within which a set of instructions for causing the machine to perform any one or more of the methodologies discussed herein can be executed. In example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a PDA, a cellular telephone, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor or multiple processors 1002 (e.g., a central processing unit (CPU), a graphics processing unit (GPU), or both), and a main memory 1004 and a static memory 1006, which communicate with each other via a bus 1008. The computer system 1000 can further include a video display unit 1010 (e.g., a liquid crystal display (LCD) or cathode ray tube (CRT)). The computer system 1000 also includes at least one input device 1012, such as an alphanumeric input device (e.g., a keyboard), a cursor control device (e.g., a mouse), a microphone, a digital camera, a video camera, and so forth. The computer system 1000 also includes a disk drive unit 1014, a signal generation device 1016 (e.g., a speaker), and a network interface device 1018.

The disk drive unit 1014 includes a computer-readable medium 1020 which stores one or more sets of instructions and data structures (e.g., instructions 1022) embodying or utilized by any one or more of the methodologies or functions described herein. The instructions 1022 can also reside, completely or at least partially, within the main memory 1004, the static memory 1006, and/or within the processors 1002 during execution thereof by the computer system 1000. The main memory 1004 and the processors 1002 also constitute machine-readable media.

The instructions 1022 can further be transmitted or received over the network 110 via the network interface device 1018 utilizing any one of a number of well-known transfer protocols (e.g., Hyper Text Transfer Protocol (HTTP), CAN, Serial, and Modbus).

While the computer-readable medium 1020 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for aggregating and sharing digital content associated with social events via a network have been described. The disclosed technique provides a useful tool to enable people to easily aggregate and share digital content such as photos, videos, and the like associated with social events via a network. The aggregation can be performed from different sources in association with the same social event. The content can also be subjected to an image recognition process to define one or more individuals appearing on the photos/videos. Shared content may also be filtered to sort only those photos or videos in which certain participants appear. In addition, users may set privacy rules to hide those parts of photos or video in which they appear.

Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed:

1. A computer-implemented method for sharing digital media content by a server within a communication network comprising a plurality of user devices, the method comprising:
   receiving digital media content from the plurality of user devices associated with two or more users, in which a first user device determines that there is a second user device located within a predetermined distance for a predetermined time period, both the first user device and the second user device located within the predetermined distance inviting their respective users to tag the digital media as taken at a same social event;
   determining that two or more parts of the digital media content are associated with the social event based at least in part on a plurality of tags;
      a first tag of the plurality of tags being automatically generated by the first user device of the plurality of user devices in response to the first user device producing a first part of the digital media content,
      a second tag of the plurality of tags being automatically generated by the second user device of the plurality of user devices in response to the second user device producing a second part of the digital media content, and
      each of the plurality of tags denoting a relationship between a respective part of the two or more parts of the digital media content and the social event;
   aggregating the two or more parts associated with the social event to produce aggregated digital media content;
   facilitating access to the aggregated digital media content by the two or more users;
   implementing a facial recognition process for the received digital media content;
   recognizing one or more individuals captured on a photo or a video, in which the photo and the video relate to the received digital media content;
   attributing a name to each of the one or more individuals who are recognized;
   displaying the name that is attributed to the one or more individuals who are recognized as a selectable target on the received digital media content; and
   bringing the user to a network-delivered content comprising the received digital media content.

2. The computer-implemented method of claim 1, wherein the digital media content comprises one or more of a digital photo, an image, a text, an audio, and a video.

3. The computer-implemented method of claim 1, wherein the user device comprises one or more of a digital camera, a video camera, a computer, a cellular phone, and a personal digital assistant (PDA).

4. The computer-implemented method of claim 1, wherein the social event comprises one or more of a meeting, a conference, a game play, and a leisure event.

5. The computer-implemented method of claim 1, further comprising obtaining contextual information related to the digital media content.

6. The computer-implemented method of claim 5, wherein the contextual information comprise one or more of a tag, a time, a date, a geographical location, a comment, social event data, and information related to one or more individuals or objects presented in the content.

7. The computer-implemented method of claim 5, wherein the associating parts of the digital media content with the social event is further based on the contextual information.

8. The computer-implemented method of claim 1, wherein the associating parts of the digital media content with the social event comprises receiving a user request to associate the digital media content with the social event.

9. The computer-implemented method of claim 8, further comprising receiving privacy instructions from the one or more individuals recognized on the photo or the video, wherein the privacy instructions comprise one or more of a restriction to share content and a modification of a photo or a video.

10. The computer-implemented method of claim 1, further comprising generating a website to share the media content associated with the social event.

11. The computer-implemented method of claim 1, wherein the image recognition process is based on contextual information.

12. The computer-implemented method of claim 1, further comprising filtering parts of the aggregated digital media content based on one or more of contextual information, a user selection, a privacy instruction, and user personal information.

13. The computer-implemented method of claim 1, further comprising determining one or more users associated with the social event, wherein the determination is based on one or more of the following: received digital media content, contextual information, and image recognition results.

14. A system for aggregating and sharing digital media content via a network, the system comprising:
  at least one subsystem configured to receive digital media content from a plurality of user devices, in which a first user device determines that there is a second user device located within a predetermined distance for a predetermined time period, both the first user device and the second user device located within the predetermined distance inviting their respective users to tag the digital media as taken at a same social event;
  at least one subsystem configured to determine that two or more parts of the digital media content are associated with the social event based at least in part on a plurality of tags;
    a first tag of the plurality of tags being automatically generated by the first user device of the plurality of user devices in response to the first user device producing a first part of the digital media content,
    a second tag of the plurality of tags being automatically generated by the second user device of the plurality of user devices in response to the second user device producing a second part of the digital media content, and
    each of the plurality of tags denoting a relationship between a respective part of the two or more parts of the digital media content and the social event;
  at least one subsystem to aggregate the two or more parts with the social event to produce aggregated digital media content;
  at least one subsystem to facilitate user access the aggregated digital media content;
  at least one subsystem to implement a facial recognition process for the received digital media content;
  at least one subsystem to recognize one or more individuals captured on a photo or a video, in which the photo and the video relate to the received digital media content;
  at least one subsystem to attribute a name to each of the one or more individuals who are recognized;
  at least one subsystem to display the name that is attributed to the one or more individuals who are recognized as a selectable target on the received digital media content;
  at least one subsystem to bring the user to a network-delivered content comprising the received digital media content; and
  a memory coupled to the at least one subsystem, the memory comprising computer codes for the at least one subsystem.

15. A non-transitory computer-readable storage medium having embodied thereon a program, the program being executable by a processor to perform a method, the method comprising:
  receiving digital media content from a plurality of user devices associated with two or more users, in which a first user device determines that there is a second user device located within a predetermined distance for a predetermined time period, both the first user device and the second user device located within the predetermined distance inviting their respective users to tag the digital media as taken at a same social event;
  determining that two or more parts of the digital media content are associated with the social event based at least in part on a plurality of tags;
    a first tag of the plurality of tags being automatically generated by the first user device of the plurality of user devices in response to the first user device producing a first part of the digital media content,
    a second tag of the plurality of tags being automatically generated by the second user device of the plurality of user devices in response to the second user device producing a second part of the digital media content, and
    each of the plurality of tags denoting a relationship between a respective part of the two or more parts of the digital media content and the social event;
  aggregating the two or more parts associated with the social event to produce aggregated digital media content;
  facilitating access to the aggregated digital media content by the two or more users;
  implementing a facial recognition process for the received digital media content;
  recognizing one or more individuals captured on a photo or a video, in which the photo and the video relate to the received digital media content;
  attributing a name to each of the one or more individuals who are recognized;
  displaying a name that is attributed to the one or more individuals who are recognized as a selectable target on the received digital media content; and
  bringing the user to a network-delivered content comprising the received digital media content.

16. A computer-implemented method for sharing digital media content within a communication network comprising a plurality of user devices, the method comprising:
  receiving digital media content captured by the plurality of user devices, in which a first user device determines that there is a second user device located within a predetermined distance for a predetermined time period; both the first user device and the second user device located within the predetermined distance inviting their respective users to tag the digital media as taken at a same social event;
  determining that the digital media content is associated with the social event based at least in part on a plurality of tags;
    a first tag of the plurality of tags being automatically generated by the first user device of the plurality of user devices in response to the first user device producing a first part of the digital media content,
    a second tag of the plurality of tags being automatically generated by the second user device of the plurality of user devices in response to the second user device producing a second part of the digital media content, and
    each of the plurality of tags denoting a relationship between two or more parts of the digital media content and the social event;
  implementing a facial recognition process for the received digital media content;
  recognizing one or more individuals captured on a photo or a video, in which the photo and the video relate to the received digital media content;
  attributing a name to each of the one or more individuals who are recognized;
  displaying the name that is attributed to the one or more individuals who are recognized as a selectable target on the received digital media content
  bringing the user to a network-delivered content comprising the received digital media content; and
  transmitting the received digital media content to a remote server.

17. The computer-implemented method of claim 16, further comprising identifying one or more attendees of the social event.

18. The computer-implemented method of claim 17, wherein the identification of one or more attendees includes identifying one or more user devices capturing digital media content associated with the social event.

19. The computer-implemented method of claim 17, wherein the identification of one or more attendees of the social event comprises receiving user input related to one or more users associated with the same social event.

20. The computer-implemented method of claim 17, wherein the identification of one or more attendees of the social event comprises identifying one or more individuals recognized during the image recognition process.

21. The computer-implemented method of claim 16, wherein the generated digital media content is associated with the social event when at least one attendee is identified.

22. The computer-implemented method of claim 21, wherein the generated digital media content is associated with the social event when at least one individual is recognized on photos or video within the media content.

23. The computer-implemented method of claim 16, further comprising prompting attendees of the social event to share digital media content captured by respective user devices.

24. The computer-implemented method of claim 16, further comprising generating contextual information associated with the digital media content, wherein the contextual information includes one or more of a tag, a time, a date, a geographical location, a comment, and social event data.

25. A system for aggregating and sharing digital media content via a network, the system comprising:
  at least one processor configured to receive digital media content captured by a plurality of user devices, in which a first user device determines that there is a second user device located within a predetermined distance for a predetermined time period; both the first user device and the second user device located within the predetermined distance inviting their respective users to tag the digital media as taken at a same social event;
  at least one processor configured to determine that two or more parts of the captured digital media content are associated with the social event based at least in part on a plurality of tags;
    a first tag of the plurality of tags being automatically generated by the first user device of the plurality of user devices in response to the first user device producing a first part of the digital media content,
    a second tag of the plurality of tags being automatically generated by the second user device of the plurality of user devices in response to the second user device producing a second part of the digital media content, and
    each of the plurality of tags denoting a relationship between the two or more parts of the digital media content and the social event;
  at least one processor configured to implement a facial recognition process for the received digital media content;
  at least one processor configured to recognize one or more individuals captured on a photo or a video, in which the photo and the video relate to the received digital media content;
  at least one processor configured to attribute a name to each of the one or more individuals who are recognized;
  at least one processor to display the name that is attributed to the one or more individuals who are recognized as a selectable target on the received digital media content;
  at least one processor configured to bring the user to a network-delivered content comprising the received digital media content;
  at least one processor configured to transmit the received digital media content to a remote server; and
  a memory coupled to the at least one processor, the memory comprising codes for the at least one processor.

26. A non-transitory computer-readable storage medium having embodied thereon a program, the program being executable by a processor to perform a method, the method comprising:
  receiving digital media content captured by a plurality of user devices, in which a first user device determines that there is a second user device located within a predetermined distance for a predetermined time period, both the first user device and the second user device located within the predetermined distance inviting their respective users to tag the digital media as taken at a same social event;
  determining that two or more parts of the captured digital media content are associated with the social event based at least in part on a plurality of tags;
    a first tag of the plurality of tags being automatically generated by the first user device of the plurality of user devices in response to the first user device producing a first part of the digital media content,
    a second tag of the plurality of tags being automatically generated by the second user device of the plurality of user devices in response to the second user device producing a second part of the digital media content, and
    each of the plurality of tags denoting a relationship between the two or more parts of the digital media content and the social event;
  implementing a facial recognition process for the received digital media content;
  recognizing one or more individuals captured on a photo or a video, in which the photo and the video relate to the received digital media content;
  attributing a name to each of the one or more individuals who are recognized;
  displaying the name that is attributed to the one or more individuals who are recognized as a selectable target on the received digital media content;
  bringing the user to a network-delivered content comprising the received digital media content; and
  transmitting the received digital media content to a remote server.

* * * * *